(12) United States Patent
King et al.

(10) Patent No.: US 7,490,124 B2
(45) Date of Patent: Feb. 10, 2009

(54) DOMAIN NAME ACQUISITION AND MANAGEMENT SYSTEM AND METHOD

(75) Inventors: Raymond King, Portland, OR (US); Ron Wiener, Portland, OR (US); Len Albert Bayles, Salt Lake City, UT (US)

(73) Assignee: SnapNames.com, Inc., Portland, OR (US)

(*) Notice: Subject to any disclaimer, the term of this patent is extended or adjusted under 35 U.S.C. 154(b) by 218 days.

(21) Appl. No.: 11/413,647

(22) Filed: Apr. 27, 2006

(65) Prior Publication Data

US 2006/0195582 A1 Aug. 31, 2006

Related U.S. Application Data

(62) Division of application No. 10/016,497, filed on Nov. 1, 2001.

(60) Provisional application No. 60/248,341, filed on Nov. 13, 2000, provisional application No. 60/245,102, filed on Nov. 1, 2000.

(51) Int. Cl.
*G06F 15/16* (2006.01)

(52) U.S. Cl. .................. 709/203; 709/217; 709/219; 709/223

(58) Field of Classification Search ................. 709/203, 709/207, 219, 223, 224, 225
See application file for complete search history.

(56) References Cited

U.S. PATENT DOCUMENTS

| | | |
|---|---|---|
| 5,671,363 A | 9/1997 | Cristofich et al. |
| 5,987,464 A | 11/1999 | Schneider |
| 6,016,512 A | 1/2000 | Huitema |
| 6,298,341 B1 | 10/2001 | Mann et al. |
| 6,338,082 B1 | 1/2002 | Schneider |
| 6,442,549 B1 | 8/2002 | Schneider |
| 6,745,248 B1 | 6/2004 | Gardos et al. |
| 6,868,441 B2 | 3/2005 | Greene et al. |
| 6,880,007 B1 | 4/2005 | Gardos et al. |

(Continued)

FOREIGN PATENT DOCUMENTS

CA 2367445 11/2000

(Continued)

OTHER PUBLICATIONS

"The Domain Name Exchange," http://web.archive.org/web/20001019052005/http://www.afternic.com/, Oct. 19, 2000, 3 pages.

(Continued)

*Primary Examiner*—Ario Etienne
*Assistant Examiner*—El Hadji M Sall
(74) *Attorney, Agent, or Firm*—Stolowitz Ford Cowger LLP

(57) ABSTRACT

A preferred embodiment of the present invention provides for transfer fulfillment or reassignment of an expired internet domain name registration to a new registrant before the registration is purged from the registry. In one example, the method calls for first identifying a registered domain name of interest, for example through expressions of interest by users of a web site; or receiving backorders from interested entities for a new registration of the domain name. Second, auctioning the expiring domain name among the interested entities. And finally, before the registration is purged from the registry, reallocating the domain name registration to the winner of the auction so that the domain name registration is not deleted by the registry.

3 Claims, 16 Drawing Sheets

Deletion Cycle

U.S. PATENT DOCUMENTS

| | | | |
|---|---|---|---|
| 6,895,430 B1 * | 5/2005 | Schneider | 709/217 |
| 2001/0037253 A1 | 11/2001 | Kensey | |
| 2002/0010767 A1 | 1/2002 | Farrow et al. | |
| 2002/0010795 A1 | 1/2002 | Brown | |
| 2002/0019800 A1 | 2/2002 | Shuster | |
| 2002/0042693 A1 | 4/2002 | Kampe et al. | |
| 2002/0065903 A1 | 5/2002 | Fellman | |
| 2002/0103820 A1 | 8/2002 | Cartmell et al. | |
| 2002/0129013 A1 | 9/2002 | Thomas | |
| 2005/0102354 A1 | 5/2005 | Hollenbeck et al. | |

FOREIGN PATENT DOCUMENTS

| | | |
|---|---|---|
| WO | WO 99/09726 | 2/1999 |
| WO | WO01/17192 A2 | 3/2001 |
| WO | WO01/22286 A1 | 3/2001 |
| WO | WO01/97486 A2 | 12/2001 |

OTHER PUBLICATIONS

"The Domain Name Exchange," http://web.archive.org/web/20001019034237/http://afternic.com/, Oct. 19, 2000, 3 pages.

"The Domain Name Exchange," http://web.archive.org/web/19991127181836/http://afternic.com/, Nov. 27, 1999, 2 pages.

International Search Report for PCT/US01/47967, issued Jul. 19, 2002.

DomainNICnames.com home page, Jul. 23, 2002.

VeriSign, "The Extensible Provisioning Protocol: XML Trust Services," white paper, © 2000.

* cited by examiner

*Customer Database*

| Field Name | Type | Size | Description |
|---|---|---|---|
| | | | ID (user doesn't see) |
| | | | First Name |
| | | | Middle Initial |
| | | | Last Name |
| | | | e-mail address |
| | | | Username |
| | | | Password |
| | | | Credit Card Type (Amex, VISA, MC) |
| | | | Credit Card Number |
| | | | Expiration (MM/YY) |
| | | | Extra 4 Digits that AMEX needs sometime? |
| | | | Work Number (Optional) |
| | | | Evening Number (Optional) |

FIG. 2A

*Desired Domain Name Database*

| Field Name | Type | Size | Description |
|---|---|---|---|
| | | | ID (user doesn't see) |
| | | | Middle Level Domain Name |
| | | | Top Level Domain Name |
| | | | Desired Checking Periodicity (Hourly, Daily, Monthly) |
| | | | Desired Billing Periodicity (Monthly, Yearly) |
| | | | Notify by e-mail every attempt, or only if available? |
| | | | Active or Dormant (No cost for Dormant desired domain name) |
| | | | Register Automatically? (If so, register under what name?) |

FIG. 2B

*Attempts Database*

| Field Name | Type | Size | Description |
|---|---|---|---|
| | | | ID |
| | | | Date |
| | | | Time |
| | | | Accredited Registrar Pinged |
| | | | Result |
| | | | Memo |
| | | | Registry |

FIG. 2C

*Customers Database*

| Field Name | Type | Size | Description |
|---|---|---|---|
| ID | AutoNumber | 20 | Unique ID of |
| FirstName | Text | 15 | |
| LastName | Text | 20 | |
| UserName | Text | 15 | |
| Password | Text | 15 | |
| Email | Text | 75 | |
| UserType | Text | 1 | Customer, Admin |
| UserActiveYN | Boolean | | If inactive, then this user cannot use serna4um |
| UserNotes | Memo | | Administrator notes on the user |
| PaidUpUntil | Date | | Sets the date that this user will be made inactive |
| EncryptedCC | Text | 50 | Encrypted Credit Card Number |
| CCType | Text | 1 | |
| CCExpire | Date | | |
| DayPhone | Text | 24 | |
| EveningPhone | Text | 24 | |
| CreatedBy (fk) | Text | 15 | The UserName that created this account |
| CreateDate | Date | | When this account was created |
| LastUpdateBy (fk) | Text | 15 | The last user to update this account |
| LastUpdateDate | Date | | The time and date of the LastUpdateBy Field if applicable |

FIG. 2D

*Desired Domain Name Database*

| Field Name | Type | Size | Description |
|---|---|---|---|
| ID | AutoNumber | | |
| SecondLevel | Text | 22 | |
| TopLevel | Text | 3 | |
| CustomerID (fk) | LongInt | | |
| DesiredDomainNameStatus | Text | 10 | |
| CreatedBy (fk) | Text | 15 | The UserName that created this account |
| CreateDate | Date | | When this account was created |
| LastUpdateBy (fk) | Text | 15 | The last user to update this account |
| LastUpdateDate | Date | | The time and date of the LastUpdateBy Field if applicable |

FIG. 2E

*Attempts Database*

| Field Name | Type | Size | Description |
|---|---|---|---|
| ID | AutoNumber | | |
| DesiredDomainNameID | LongInt (fk) | | |
| AttemptDate | Date | | Default Now() |
| AttemptResult | Text | 255 | |
| AttemptDetail | Memo | | |

FIG. 2F

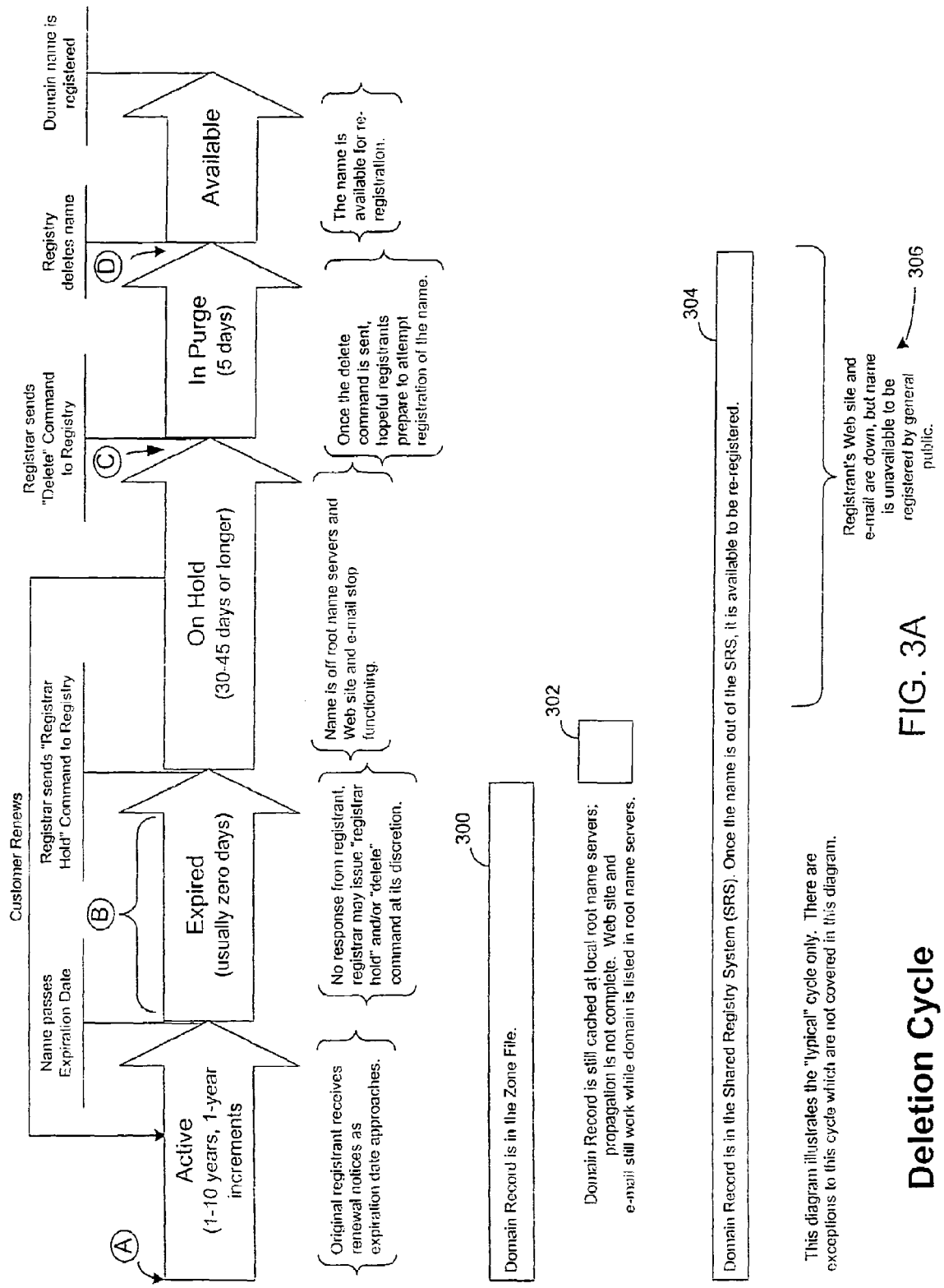

Auction Tagger

DOMAIN NAME ACQUISITION AND MANAGEMENT SYSTEM AND METHOD

RELATED APPLICATIONS

This application is a divisional of and claims priority to U.S. patent application Ser. No. 10/016,497, filed on Nov. 1, 2001, which in turn claims the benefit of U.S. Provisional Patent Application No. 60/245,102, filed Nov. 1, 2000, and U.S. Provisional Patent Application No. 60/248,341, filed Nov. 13, 2000, all incorporated herein by this reference.

COPYRIGHT NOTICE

©2006 SnapNames.com, Inc. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

TECHNICAL FIELD

The present invention relates to the field of managing identification resources, and, more specifically, to domain name registration and management on a distributed computer network, such as the Internet.

BACKGROUND OF THE INVENTION

In distributed computer networks, being able to locate individual computers, servers, or various other machines on the network is critical. On the Internet, one of the most valuable identification resources is the domain name. Internet domain names provide a convenient way to reference Internet Protocol (IP) numerical addresses. Presently, IP addresses are 32-bit integers. They comprise four numbers separated by periods. Every "host" machine (e.g., computer, etc.) connected to the Internet must be identifiable by a specific numerical IP address. However, people prefer to reference host machines by pronounceable, easily remembered names, referred to as "domain names." The Internet implements a Domain Name System (DNS) to facilitate matching specific domain names to specific hosts.

The DNS is a distributed database system that allows computer applications to map between domain names and IP addresses. The DNS also provides electronic mail routing information and many other services. Individual components of the DNS distributed database can be cached locally, or stored on any of numerous distributed machines. The DNS data correlates each domain name to a specific numeric IP address. If a computer's local cache does not have the information to resolve a domain name into an IP address, it sends a request to other computers that may contain the resolution information. The DNS affords a domain name some measure of independence from the physical location of a host. The host can be moved to a new location on the network, but it can still be accessed using the same domain name. As long as a user can remember the domain name, the host can always be located, even if the IP address changes over time. This illustrates the value of a domain name that is easy to remember.

Physically, the DNS comprises many servers and other computers or machines that run software and store data permitting computers to query the DNS database. One such machine is the "root server." A root server is a server computer that maintains the software and data necessary to locate "name servers" that contain authoritative data for a specific domain, such as the ".com" top level domain. There are presently thirteen root servers throughout the world. Name servers are computers that have the software and data to resolve the domain name into an IP address. The data accessible through the name server is often referred to as a "zone file." A "zone" is a subset of the total domain name space. The domain names in that subset are stored in the zone file for that name server. There is a zone file for each domain space (i.e., zone).

The DNS is organized in a hierarchical, tree structure. A domain name is the label representing a specific domain within the total possible domain space available in the DNS. The highest level in the DNS hierarchy is the "root," which is technically unnamed but often referred to as the "." or "dot." The level immediately below the root in the DNS hierarchy is the top-level domain, or "TLD." It is called the "top-level domain" because it is the highest level in the hierarchy after the root. The TLD appears furthest to the right in an English-language domain name. For example, "gov" in the "uspto.gov" domain name. There are various types of TLDs. The term "gTLD" is interchangeably used to refer to a "global top-level domain" or a "generic top-level domain." A global TLD is one that can be registered by an entity regardless of the entity's geographic location or political boundary. For example, a person, corporation, or other entity located anywhere in the world can register a name in the ".com" domain. However, because an entity must have a presence in the United Kingdom to register a name in the ".uk" TLD, that domain is not a global TLD. Similarly, a generic TLD represents a domain in which an entity can register a name regardless of what type of entity it is. For example, because any entity can register a name in the ".com" domain, while only military entities can register a name in the ".mil" domain, the ".com" domain is an example of a generic TLD and the ".mil" domain is an example of a "specific TLD." The ".uk" domain is also an example of a "country code" TLD, or "ccTLD," applicable to the United Kingdom. Other examples of ccTLDs include ".fr" for France, ".ca" for Canada, ".jp" for Japan, and ".us" for the United States of America.

By registering a domain name in a particular TLD, the TLD is sub-divided into lower levels in the DNS hierarchy. A second-level domain is the level in the DNS hierarch immediately below the TLD. An example of a second-level domain would be "snapnames" in the "snapnames.com" domain name. The level in the DNS hierarchy immediately below the second-level domain is the third-level domain. An example of the third-level domain would be "portland" in the "portland.or.us" domain name. Further subdivisions can be created in a similar manner. Domain names at each level of the hierarchy must be unique. Thus, while there can be only one "snapnames" registered in the ".com" TLD, there can be a "snapnames.net" domain name.

Historically, domain name registration has been conducted under a Shared Registration System (SRS). The SRS was created by Network Solutions, Inc. in 1999 to provide a registry backend through which multiple, globally diverse registrars could register domain names. The term "registry" refers to the entity responsible for managing allocation of domain names within a particular name space, such as a TLD. One example of a registry is the VeriSign, Inc. registry for the .com, org, and .edu TLDs. The term "registrar" refers to any one of several entities with authority to add names to the registry for a name space. Entities that wish to register a domain name do so through a registrar. The term "registrant" refers to the entity registering the domain name. In some name spaces, the registry and registrar functions can be operated by the same entity, so as to combine the concepts and functions of the "registrar" and "registry." The combined registry-registrar model is implemented in many ccTLDs and a few gTLDs. The overall registration system, including multiple registries, is overseen by the Internet Corporation for Assigned Names and Numbers (ICANN). ICANN is a non-profit corporation responsible for the IP address space allocation, protocol parameter assignment, domain name system management, and root server system management functions previously performed under U.S. Government contract by the Internet Assigned Numbers Authority (IANA) and other entities.

Domain names have become important assets for individuals, businesses, and organizations alike. At the same time, they are difficult to keep track of and can be lost in several ways. There are many examples of domain names being hi-jacked by hackers or cybersquatters with malicious intent. A disgruntled webmaster can walk away with a critical domain name. Domain names can be lost accidentally by a registrar. In addition, an owner simply forgetting to renew a subscription will often result in domain name loss.

Even though they are quite valuable, only approximately 10% of the registered domain names are actually in use; that is, resolving to active Web sites with more than token content. There are many people who would like to use a domain name that is registered by someone else but not in use. Additionally, there are individuals who own domain names but do not have immediate plans to use them and who would be willing to transfer them to another individual for appropriate compensation.

Registration of available names is currently done on a first-come, first-served basis. Even after an entity registers a domain name, if they allow the registration to lapse, someone else may register the name. If an entity wishes to register a domain name that is currently registered to someone else, that entity would manually have to check the domain name registry with great frequency to ensure they will be the first to request registration of the name when it becomes available. If a registrant mistakenly forgets to renew the registration and the name becomes available, the former registrant would have to attempt to re-register the domain name as quickly as possible, before some other entity requests registration of that name. Registrants have never had an efficient and reliable system to prevent inadvertent loss of a domain name registration. Neither have registrants nor other interested entities had a means for ensuring successful registration of a domain name once it becomes available.

What is needed is a system to provide an efficient, organized, and reliable method for tracking, acquiring, and protecting Internet identification resources such as domain names. The present invention fulfills this need.

SUMMARY OF THE INVENTION

A preferred system consistent with the present invention will accept a single or set of desired domain names from an individual entity or another system (referred to herein as an "interested entity"). The desired domain names are names that an interested entity desires to register through a domain name registration system or systems, such as that operated by a registrar.

The present system will closely monitor the domain name registry and registrar databases used to provide domain name resolution or registration on the Internet, or any other network, and determine the expiration, deletion and impending purge from the central registry, and/or availability of the name or names supplied by the interested entity. This domain name database monitoring can be performed by a manual, semi-automated, or fully automated process.

When a desired domain name appears to be available, the system will attempt to register or re-register the domain name through a domain registration service. The process of registering the desired name or names can be manual, semi-automated, or fully automated. If there is more than one interested entity for a particular second-level domain name (e.g., "snap-names," without regard to the TLD), the present invention can also facilitate an auction of that second-level domain name.

Additional objects and advantages of this invention will be apparent from the following detailed description of preferred embodiments thereof which proceeds with reference to the accompanying drawings.

Additional aspects and advantages will be apparent from the following detailed description of preferred embodiments, which proceeds with reference to the accompanying drawings.

BRIEF DESCRIPTION OF THE DRAWINGS

FIGS. 2A-2F provide illustrative examples of the types of data records and data fields that can be stored in databases of the system of FIG. 1.

FIG. 3A diagrams a typical deletion cycle for an expiring domain name.

DETAILED DESCRIPTION OF PREFERRED EMBODIMENTS

Figure 1:
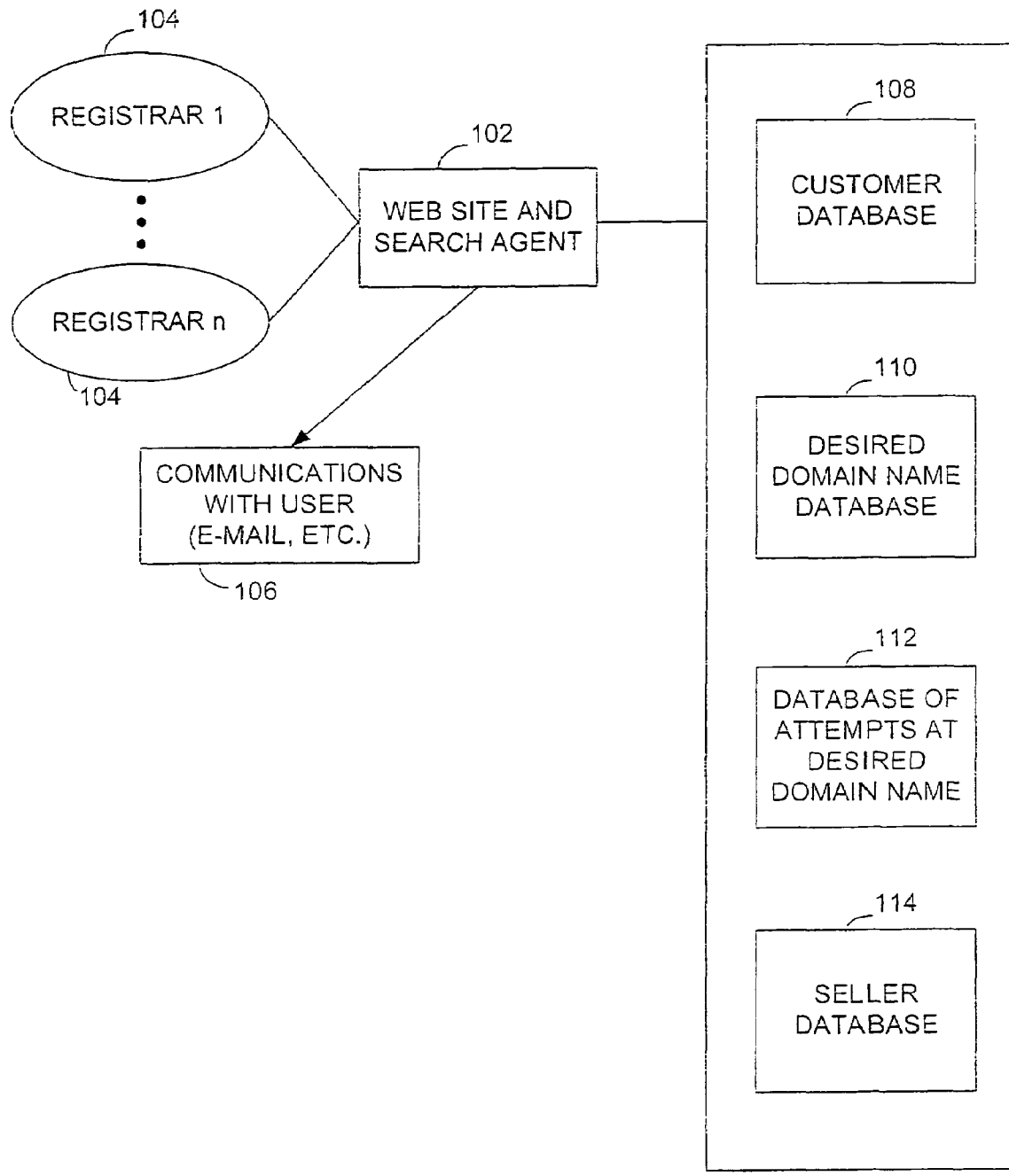
FIG. 1 diagrams one embodiment of a system according to the present invention.

A preferred embodiment of the present invention is designed to monitor domain name registration record additions, changes, and deletions from registry and registrar databases and immediately acquire or re-acquire a desired domain name if it becomes available. Prior to this invention, to be confident of renewal, a registrant of a domain name had to calendar the renewal date of its domain name and manually renew the domain name before the renewal period ended. Failure to do so could result in expiration of the registration, loss of ownership of the domain name upon deletion of the name by the registrar, and purge by the central registry.

The present invention can help mitigate these problems in at least two ways. First, it provides prompt notification to registrants (or other interested entities) of any changes in the domain name record. This allows earlier action to mitigate the effects of oversight or malicious intent. Secondly, it will re-acquire the name automatically if the registration is accidentally allowed to expire and the name goes into the delete cycle. This obviates the need for a registrant to purchase the name back from someone else, sometimes at a very high cost, or to litigate over the name. It also helps prevent discontinuity in services using the registered domain name.

The present invention can also serve the needs of people who want to acquire a domain name that they do not presently own. Traditionally, a person wanting a domain name that was registered by another entity would periodically and manually have to check its availability. Such a process is time-consuming and often results in losing the domain name to someone who sees that it is available. There are no entities operating in a safeguarding capacity to receive an indication of a desired domain name from an interested third party in order to reliably monitor the domain name and register it on behalf of the interested third party at some later time when the domain name becomes available. An embodiment of the present invention allows an entity that desires a domain name to wait for the domain name registration to expire, knowing that when it expires and deletes from the registry, the entity should be able to register the name before anyone else does. It is a way to get "next in line" for the name. Two ways the present invention can accomplish this are through making periodic registration requests and forming contractual alliances with one or more domain name registrars. Other ways include integrating technology at the registry level or striking contractual alliances with registries.

A preferred embodiment of the present invention comprises a program that stores information about people, corporations, or other interested entities desiring specific domain names, and it regularly polls major domain name registrars, the central registry, or the combined entity, as appropriate, to check the availability of the desired names. Software consistent with the present invention can be implemented directly on the network to facilitate access by remote users. For each interested entity wanting one or many domain names, the software or system can store the person's name, address, credit card number, and other useful business information necessary for providing technical, billing, and administrative contact information to the registry and registrar WHOIS databases, as well as a list of domain names that person is interested in acquiring.

The present invention can then periodically and automatically check with one or more combined registries/registrars or a central registry and automatically register a name if the name is available, or re-register a registered name if the registration period has expired and the name is about to delete. The periodicity can be varied programmatically. Availability information can be determined by periodically pinging or pulling data from the data sources, or by establishing partnerships with the data sources, whereby the data source will periodically push data to a system embodying the present invention.

FIG. 1 depicts a system consistent with the present invention. A search agent 102 can be provided to access one or more domain name registrars 104 to register or re-register domain names. The search agent 102 can be made accessible to the general public via a Web site. Confirmation, information requests, or other relevant communications can be sent to a remote network user through e-mail 106 or other appropriate communications channels. The search agent 102 can access one or more databases containing pertinent information. Examples or such databases include a customer database 108, a desired domain name database 110, and an attempt database 112 for tracking attempts made to register or re-register the domain names stored within the desired domain name database 110 or for WHOIS look-ups. Additionally, a seller database 114 can be maintained to store information about entities wishing to sell a registered domain name.

FIGS. 2A-2F provide illustrative examples of the types of data records that can be stored in various databases in a system consistent with the present invention. These include the customer database 108, desired domain name database 110, and attempt database 112 of FIG. 1. These examples are for illustrative purposes only, and an individual skilled in the art will readily see that various other types of data could be stored as well. The actual data stored in the databases, the data fields, or even the types of databases, can depend on the particular implementation and functionality desired. Other commonly stored data can include technical, administrative, and billing contact information typically used to populate registry or registrar WHOIS databases.

If an interested entity has provided credit card or other billing information to the system, the interested entity can elect to have the system automatically register the name if it becomes available. In the alternative, a domain name can be registered in the name of a trustee or escrow agent and subsequently transferred to the interested entity. Billing information can be encrypted for secure storage and additional security. The system can be set to check the availability or status of names at any periodicity. For example, the present system can afford sufficient flexibility to allow the status of a name to be checked with greater frequency around the time of the name's anticipated date of deletion from the central registry. The system can also be operated on behalf of one particular interested entity, or it can be made available to the public generally, in which case priority rules can be implemented to ensure an orderly process.

In one embodiment, implementations of the present invention can generate revenue by charging one or more service fees for checking names, informing individuals of changes to the domain name records, and registering desired names that become available. To maximize the utility and ease-of-use of the present invention, billing for services to interested entities can be at any convenient frequency (for example, monthly or yearly). In addition, attempts to register domain names, or other records, routinely can be time- or date-stamped to produce an audit trail that is available at substantially any time.

Description of Acquisition Services and Monitoring Services

A preferred embodiment of the present invention can include several aspects or different services. As one alternative, these services can be provided as part of an ongoing business concern. The following two services are particularly valuable components of the present invention: domain name acquisition services and domain name monitoring services.

Acquisition services can include several different components. For example, the scope of acquisition services can encompass monitoring all changes in the registration record for a given domain name. Subscribers of the service can be instantly alerted (or they can designate an agent, such as an attorney, to be alerted) in the event of a change to the registration record. If the registration expires and the domain deletes, the domain name can be acquired automatically and instantly on behalf of the subscriber. These and other related services can be offered for a fee by a business implementing the present invention, and a money-back or similar guarantee can be offered if a name is not registered or re-registered upon deletion of the prior name. Value-added services can also be provided. Once such example would be a periodic newsletter or journal summarizing current issues of upcoming events. If only one customer of this service is allowed for any given domain name, then that customer can be virtually assured that the domain name will be successfully registered to them once the prior registration expires and the name deletes. Customers of a business implementing this invention can include such likely candidates as current domain name registrants that wish to protect their registration(s), as well as prospective registrants that wish to get "next in line" to acquire a domain name when the prior registration expires and the name is deleted by the central registry. Embodiments of the acquisition service may also be implemented to attempt to acquire an advanced registration or reservation for a domain name as new domains (TLD or domains at other levels) are created.

Monitoring services can be offered independently from or in addition to acquisition services. A business providing monitoring services consistent with the present invention could monitor changes in the domain registration record for a domain name indicated by a service subscriber, and the subscriber can be notified of changes in the record. News, information, and events can also be offered in a periodic journal or newsletter offered with the service. Unlike for the acquisition service, the monitoring service can have multiple subscribers per domain name. However, unless someone has subscribed to the acquisition service, registration or re-registration of the domain name would still be on a first-come, first-served basis. Monitoring services can be used by prospective domain registrants to track either active or inactive domains, and to track a competitors' movements. The monitoring services can also help indicate interest in a particular domain name. This level of interest can help identify domain names that would be good candidates for auctions.

Domain Name Deletion and Registrability Timing

Figure 3B:
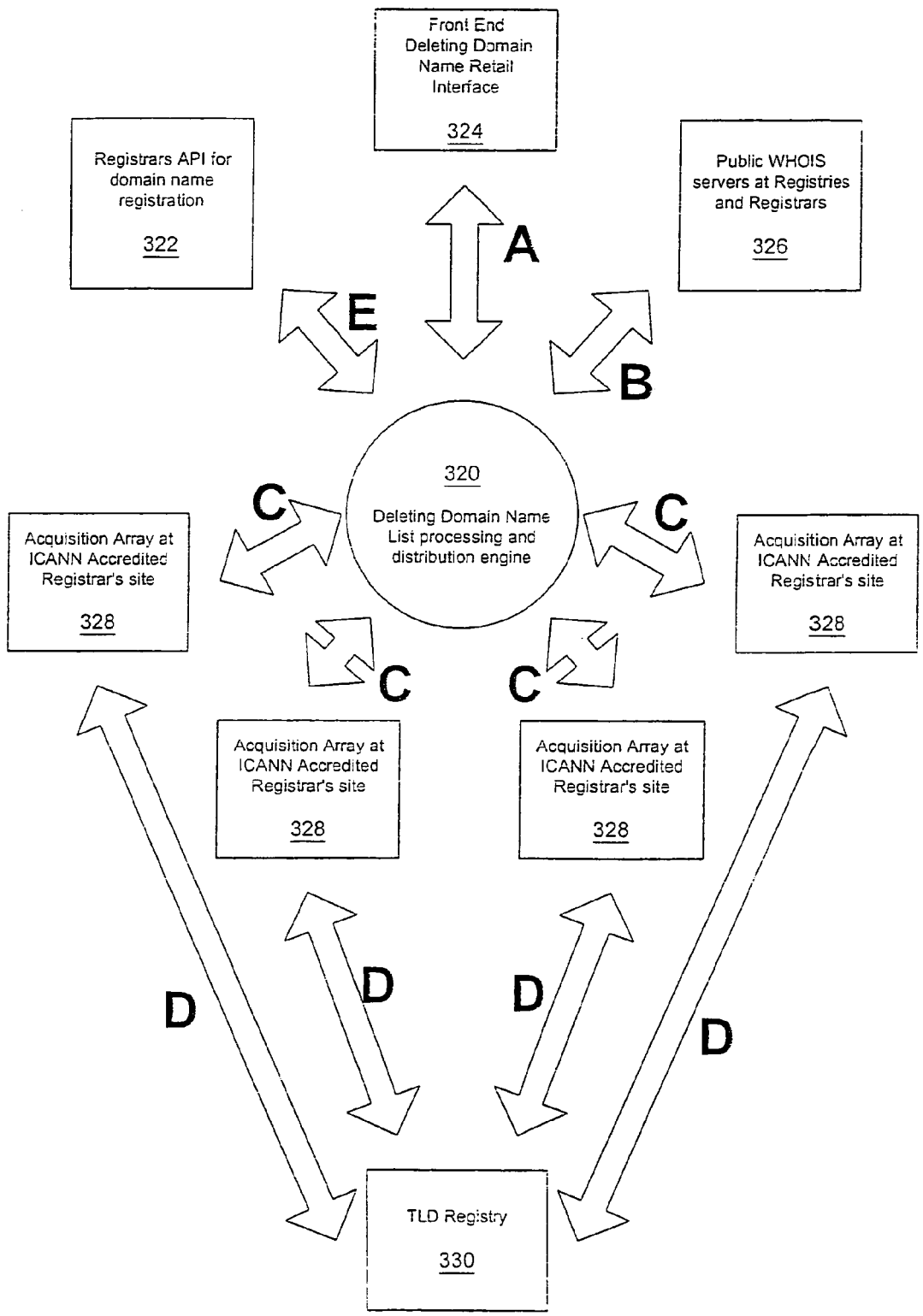
FIG. 3B schematically illustrates communications links for an Deleting Domain Name Acquisition Cluster used to register deleting domain names.
Figure 3C:
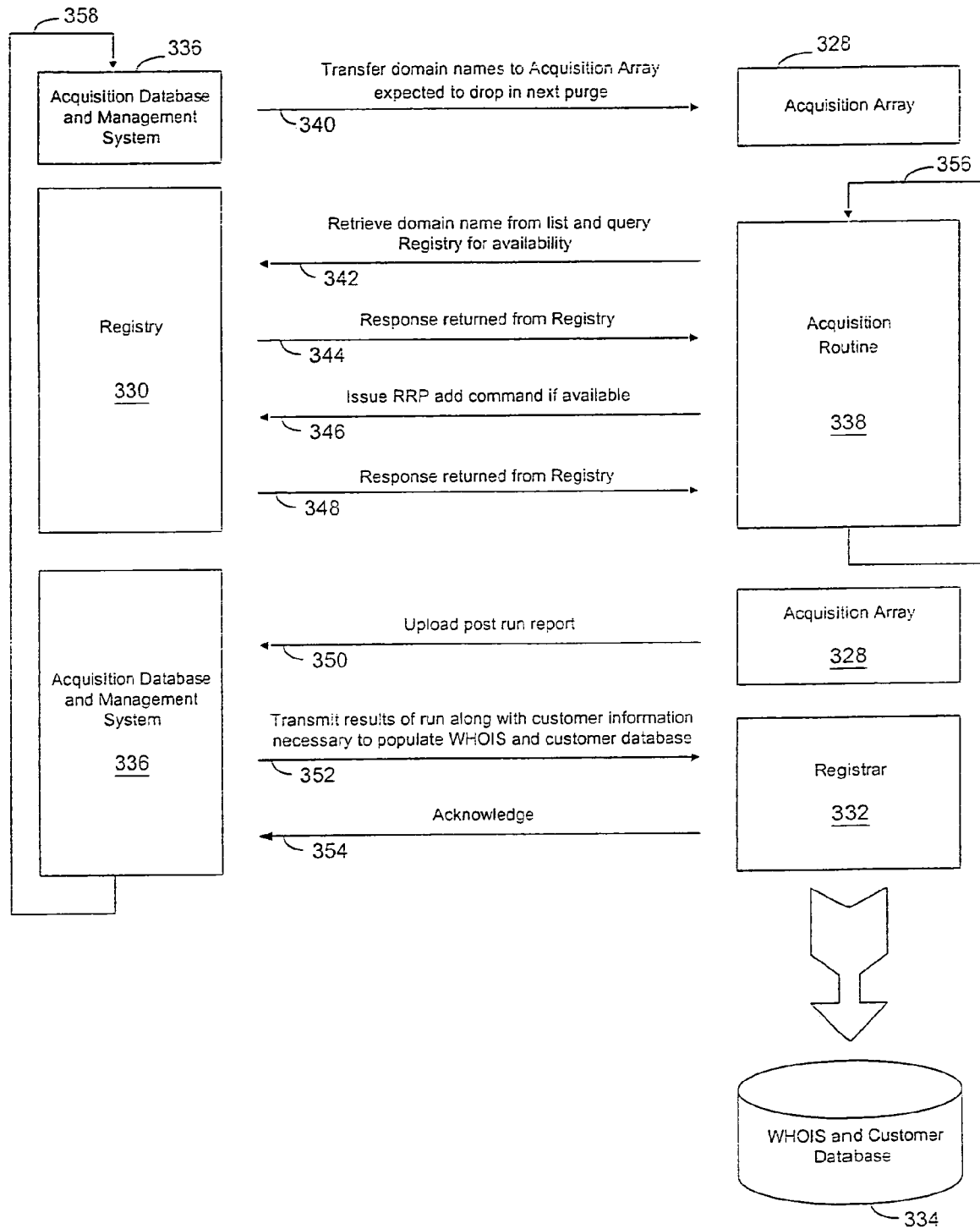
FIG. 3C is a communications flow diagram illustrating the typical communications during operation of the domain name acquisition array and acquisition routine components of the Deleting Domain Name Acquisition Cluster of FIG. 3.

In order to appreciate the acquisition or reacquisition process and timing, it is first helpful to understand the current process and timing for expiration and deletion of domain name registrations. Understanding the process highlights the advantages of the present system and method for reacquiring deleted domain names. Typically, domain names registrations expire and delete according to the timeline illustrated in FIG. 3A. FIGS. 3B and 3C illustrate the use of domain name acquisition arrays to acquire available domain names with a high level of reliability.

FIG. 3A illustrates a typical deletion cycle, although various exceptions or alternative timelines can exist. One such exception has been with the deletion cycle for which Network Solutions, Inc. served in both the registrar and registry capacity for a particular domain name. Expired domains names were, and sometimes still are, deleted from the purge queue in a much less predictable fashion. However, illustrating a typical example of the deletion cycle, FIG. 3A emphasizes four instances or transaction events. At point A, a domain name is registered. At point B, the domain name registration expires. At point C, the registrar deletes the domain name record. At point D, the registry purges the deleted domain name record. The period between the points A and B can be up to ten years, in one-year intervals. The registrant typically receives renewal notices from the registrar as the expiration date approaches. If there is no response or renewal from the registrant, the registration expires at point B. When this occurs, the registry will automatically renew the domain. The registrar will now have a window of approximately thirty to forty-five days, sometimes longer (the period between B and C), in which to delete the domain and effectively cancel the registry's auto-renewal. If the registrar does not cancel the registration before point C, the domain will be renewed for a one-year period and the registrar is committed to the fee charged by the registry for a one-year registration.

During the period between points B and C, the registrar may opt to put the domain on "registrar-hold." This hold will remove the domain from the global Domain Name Servers effectively disabling the domain unless the registrar is paid for the renewal. If the registrar deletes the domain before point C, the domain will exist in a purge queue at the registry for approximately 120 hours (between points C and D) before final deletion. In this state, the domain name is not available for registration and will not be active. After point D, registration of the domain is "up for grabs" on a first-come, first-served basis through any authorized registrar.

Until the registration expires 300, the domain record is in the zone file for the relevant domain. For a short period after the expiration 302, the domain record is still cached at local root name servers, but propagation of the change across all servers is not complete. Services such as a Web site and e-mail for that domain name will still work while the domain is listed in the root name servers. After the domain name record is off the name servers, my associated Web site and e-mail stop functioning. During the period 304 between the domain name being registered and the registration being purged, the record is still in the SRS. After the name is no longer in the SRS, it is available for a subsequent registration. For the period 306 after the record is no longer in the root servers but before it is purged, the Web site and e-mail for that domain name no longer function, but the name is not available for registration by the general public.

Acquisition Engine Array for Successful Acquisition of Deleted Domain Names

As can be seen with reference to FIG. 3A, punctual timing is crucial when trying to register a recently available domain name. Embodiments of the present invention achieve a high success rate in domain name acquisition either by implementing a "deleting domain name acquisition cluster," which is a distributed system designed to monitor and register domain names as soon as possible after they are deleted from a registry, or by integrating an acquisition engine directly into the registry system. The components of an acquisition array system include a front end that receives requests from customers wanting to register soon to be deleting domain names, a processing and distribution engine, and one or more acquisitions arrays that operate in connection with a registrar's site for direct communications with a registry to perform the necessary operations to monitor and add domain names. The manner in which these various components communicate with each other is schematically diagrammed in FIG. 3B.

In FIG. 3B, domain names are identified in any reasonable manner by interested entities. Methods can include a Web site, e-mail, fax, direct customer call-in, or any suitable method that allows domain names to be delivered to the processing and distribution engine. This is illustrated with the front end deleting domain name retail interface 324 in FIG. 3B. The interface 324 communicates with the processing and distribution engine 320 via communications channel A.

Once domain names have been transmitted to the database in the processing and distribution engine 320, they are evaluated to establish their current state in the deletion cycle. The process of evaluation collects data, using channel B in FIG. 3B, from the public WHOIS servers at the registry or registries and, if necessary, the registrar 326. Domain names found to be in a state of near availability (such as those with a status ranging between points B and D in FIG. 3A) are transmitted, through any or multiple of the various channel C pathways, to one or more of the acquisition arrays 328. The transmission protocol is typically a Secure Socket Layer (SSL) encrypted TCP/IP connection established over the Internet from a central site to each individual acquisition array 328. Each acquisition array 328 communicates with one or more registries 330 through the registrar via the registrars registry protocol connection with each registry, illustrated by communications channels D. Registry protocols can include RRP, EPP, or other present or future protocols. For simplicity, the term "RRP" is used herein to refer to any such acceptable communication, protocol between a registrar and a registry. FIG. 3B also illustrates a registrar API 332 for domain name registration. The registrars' API 322 communicates with the processing and distribution engine 320 via communications channel E and is used to register a domain name with a registrar.

Currently there are two methods by which a registry makes deleted domain names available for re-registration once a registrar issues a delete command. The first is an immediate delete that will make the domain name available for registration as soon as the registrar issues the delete command to the registry. The other method, referred to as a "batch purge," involves multiple domain names that are collected by the registry after a registrar issues the delete command and then are released in a single batch. The acquisition arrays are designed to monitor and acquire domain names regardless of the method the registry uses to make available deleted domain names.

Depending upon the mode of operation, results of the acquisition job can either be transmitted back to the processing and distribution engine in real time, or after a completed job in a batch. The resulting data can be converted to reports that are distributed back to the relevant registrar for accounting purposes and so that customer WHOIS data can be stuffed into the registrars WHOIS database.

Each acquisition array 328 is an array of computers specifically designed to monitor and acquire deleting domain names that are expected to become available during the registry's purge process. In an alternative embodiment, an acquisition array 328 can be one computer with multiple communication ports and processor resources sufficient enough to establish multiple RRP connections with the registry. An acquisition array 328 is typically hosted at a registrars site. The communications software of an acquisition array is preferably limited to issuing only RRP "check" and "add" commands in accordance with limits outlined by the registry and any other standards agreed upon by operators of the acquisition array and the host registrar, affecting such things as the rate of querying. The components of an acquisition array 328 are highly secure, with all communications using SSL-encrypted messages, or other secure means, to communicate with the registry or the domain name master database that stores the information about the deleting names.

FIG. 3C illustrates a communications flow for domain name acquisition during a registry's "add storm." While the following procedure is described with respect to a single domain name, those skilled in the art will readily ascertain that it can apply equally well to a list of multiple domain name. Acquisition of multiple domain names can be attempted in series or in parallel using multiple acquisition arrays or communication ports.

When it is determined that a domain name for which acquisition services were requested has deleted and will soon be purged, the domain name is identified in a transmission 340 sent to the acquisition array 328. The identification of the deleting domain name 340 originates from a "database and management system" 336. The database and management system 336 includes the processing and distribution engine 320 of FIG. 3B and a master database of domain names and registration information. The identification of the soon-to-be-deleted domain name 340 is routed to an acquisition array 328 located at a registrar's site where the domain name should be registered if successfully acquired. Alternatively, the domain name can be identified to multiple acquisition arrays located at multiple registrars. Such duplicated efforts would help ensure successful acquisition of the domain name. The domain name can be registered at the site of the registrar hosting whichever acquisition engine successfully acquired the name. The deleting domain name can be, but it does not have to be, registered through the registrar of the prior registration.

Once the domain name (or list of domain names) is transmitted to the acquisition array 328, the array 328 attempts to acquire the domain names during the "add storm," when the registry purge cycle begins. For the VeriSign Registry, for example, the add storm comes on the heels of a batch purge. Presently, this typically occurs around 2:00 p.m. E.S.T. Acquisitions are preferably accomplished by a series of check and add commands. In FIG. 3C, the add storm procedures begins with a retrieval of a domain name from the acquisition array's acquisition routine 338 and a query 342 of the domain name's availability from the registry 330. The registry 330 then returns a response 344 to the acquisition routine 338. If the name is available, the acquisition routine 338 issues an RRP add command 346, and a response 348 is returned from the registry 330. The acquisition routine 338 can repeat 356 for each domain name expected to be deleted during that purge cycle; and it can repeat 356 to re-check the availability of a domain name if the domain name was not available responsive to the prior query 342. Return arrow 358 indicates that the process of FIG. 3C may repeat if the domain name is not purged from the registry.

The rate of queries and the bandwidth consumed during the acquisition process can be tuned daily. These parameters are set according to the number of domains in the batch, the quality of the domain name list (i.e., some domain names may be more important acquisitions that others—due to financial value or other considerations), and limits set by the registrar. After completion of the run, logging information is transmitted 350 back to the database and management system 336. Registrars 332 can then be notified 352 of successfully added domain names and be sent the associated customer information necessary to populate their WHOIS and customer databases 334 for the newly added domain names. The information necessary for populating the WHOIS databases can be stored in the master databases of domain name and registration information at the database and management system 336. The registrars 332 preferably acknowledge 354 receipt of the information.

Acquisition success is dependent, in large part, upon the total number of connections to the registry, and the rate at which queries are made. In the current environment connections can become scarce during the period of the add storm. In a preferred embodiment, a minimum of three hundred connections are made available for use during the add storm. Generally, the more connections that are available, the better connections can also be acquired many hours in advance of the add storm acquisition run. When these connections are acquired they can be idled at a lower rate until the add storm begins. The domain names being monitored during this period also include names that are expected to drop off hours later—those not expected to be in the add storm. These are typically domain names held by registrars other than Network Solutions (now VeriSign).

Integration of the acquisition array on the registrar's site requires that connectivity can be established between the database and management system, the registry, and the acquisition engine. Preferred ports for operation are 648 to the registry, SSH, NTP, and an individually specified port for the SSL encrypted messaging with the database and management system. Dedicated routable IP addresses also should be provided for the operation of the acquisition engine.

Procuring Information and Registering a Domain Name

It should be evident from the foregoing discussion that being well informed of domain name registration or deletion events is very useful to systems embodying the present invention. Domain name status and information can be obtained from a registrar through various mechanisms. The first mechanism is through periodically "pinging" (or querying) registrars' servers to determine if a name is available, and if so, to register the name. Information may also be obtained by directly pinging the registry server. This would especially be the case in a "thick registry system," where the majority of registration information (such as billing, administrative, and technical contact information) is stored at the registry level. In any embodiment, increasing the frequency of the ping helps ensure that the name can be registered to an entity employing the present invention, and not to a third party.

An alternate preferred embodiment adopts a second mechanism for obtaining information and ensuring prompt registration. In the second mechanism, partnerships or contractual agreements can be entered into with the various registrars. As part of these relationships, each registrar can give operators of the present invention a right of first refusal to register a name that becomes available for registration or transfer. For example, a registrar can notify an interested entity that a registrant will not be renewing a registration and the name will become available. As one option, the name can be renewed before it is purged and transferred to the interested entity. This ensures that no third party will be able to register a recently-available name before an operator of the present invention has an opportunity to do so. Notifications to interested entities can use standard technology in the art of pushing data over a network to remote hosts. Conventional correspondence (e.g., fax, telephone, mail, etc.) can also be employed.

The RRP event monitoring technology of the present invention can be designed to work regardless of the domain industry model. Today, the model includes multiple registrars all connecting to a single global top level domain (gTLD) or country code top level domain (ccTLD) registry. This model will scale as new gTLD and ccTLD registries are added. Event notification can be transmitted either from the registrar or directly from the registry. This can be accomplished by establishing a partnership with the registry operator. Also, most county code top level domain (ccTLD) registries work in the same manner as systems in which the registrar and registry functions are combined today.

The RRP was designed by Network Solutions, Inc. in order to facilitate the Shared Registration System (SRS) that allows for multiple registrars. The technology of the present invention anticipates that the RRP (or other suitable protocol) may be different with each new registry and is not dependent upon the current standards for its application program interface (API) to work in new, multiple-registry environments.

Figure 4:
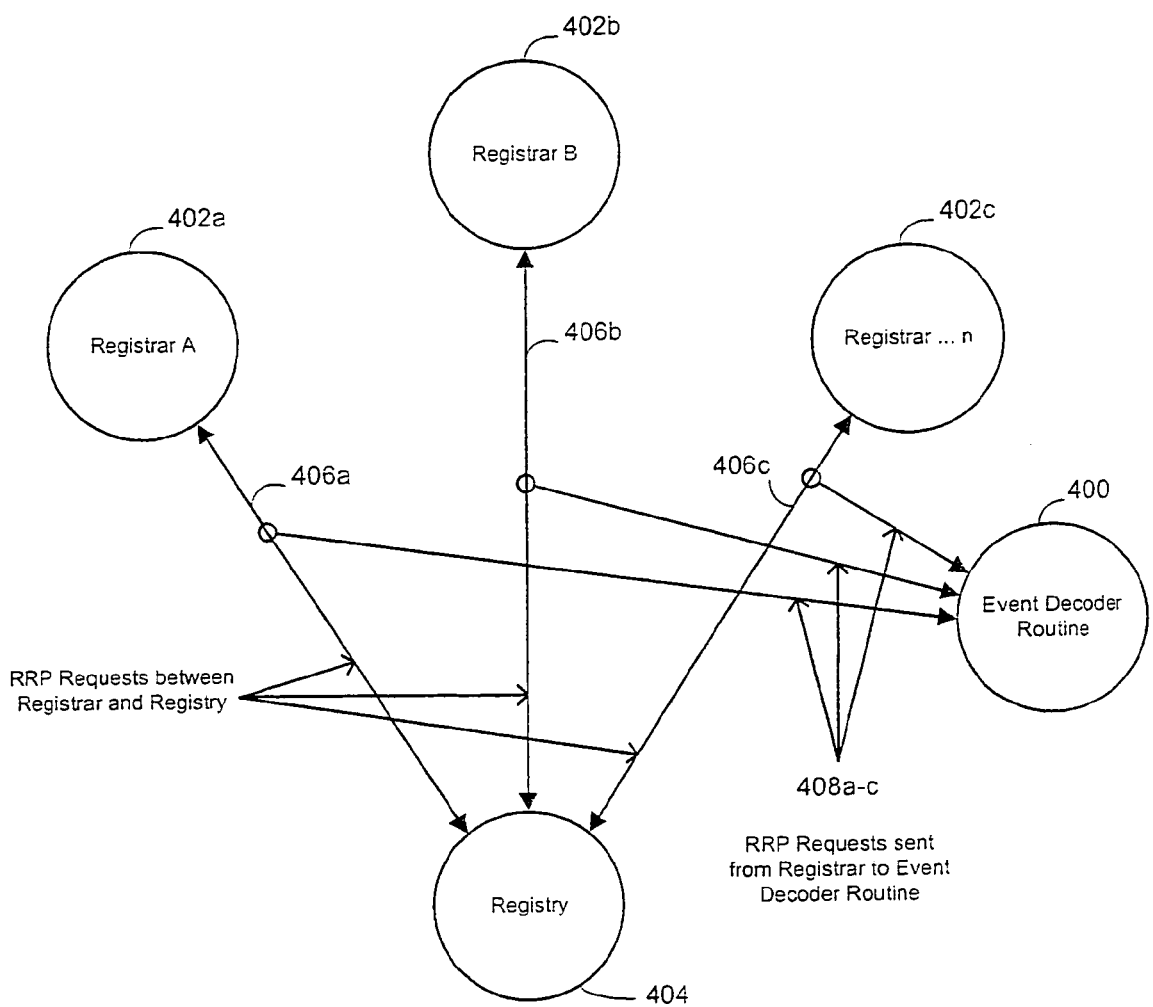
FIG. 4 schematically illustrates an event decoder routine's connection with a system comprising one registry and multiple registrars.
Figure 5:
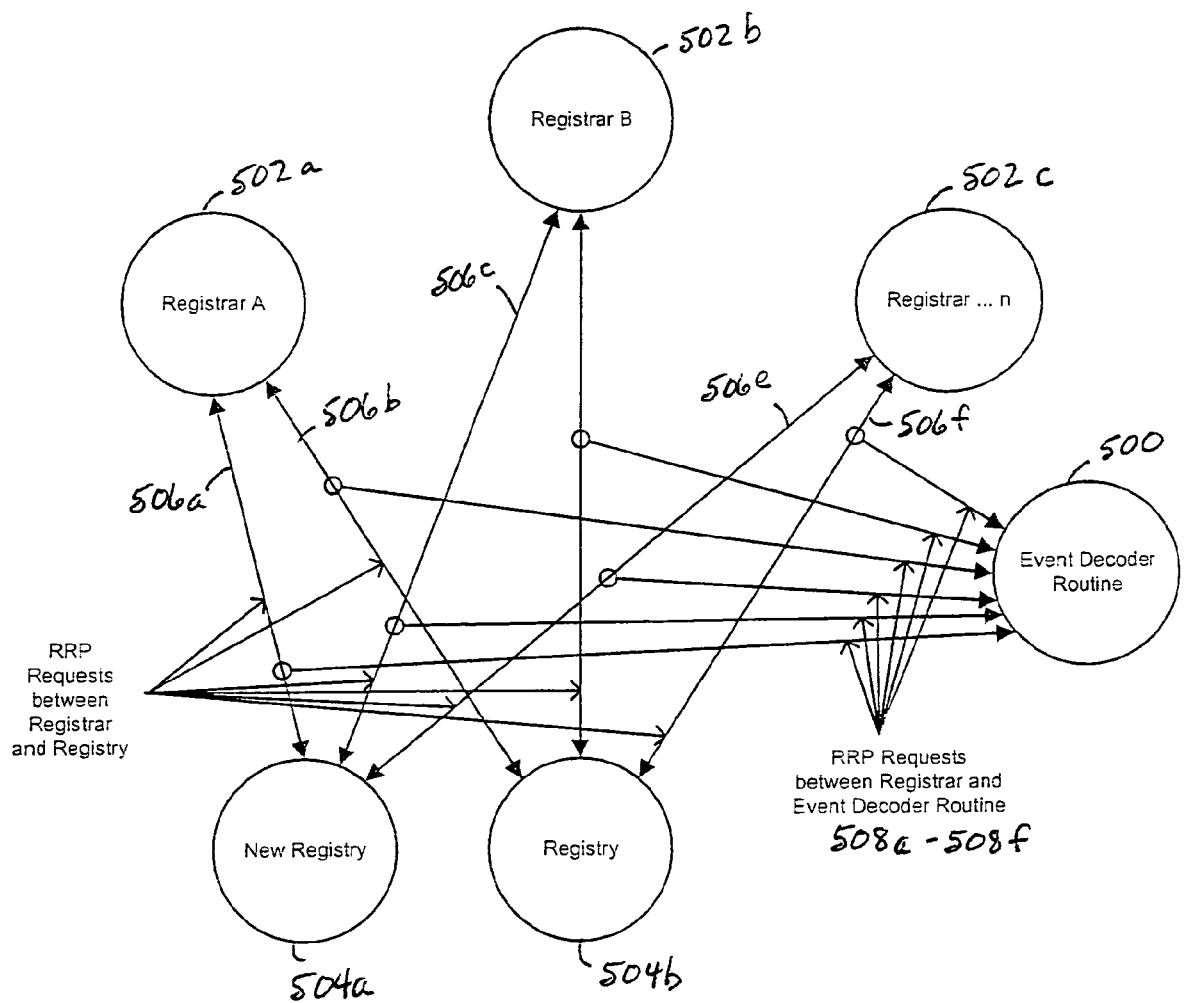
FIG. 5 schematically illustrates an event decoder routine's connection with a system comprising multiple registries and multiple registrars.
Figure 6:
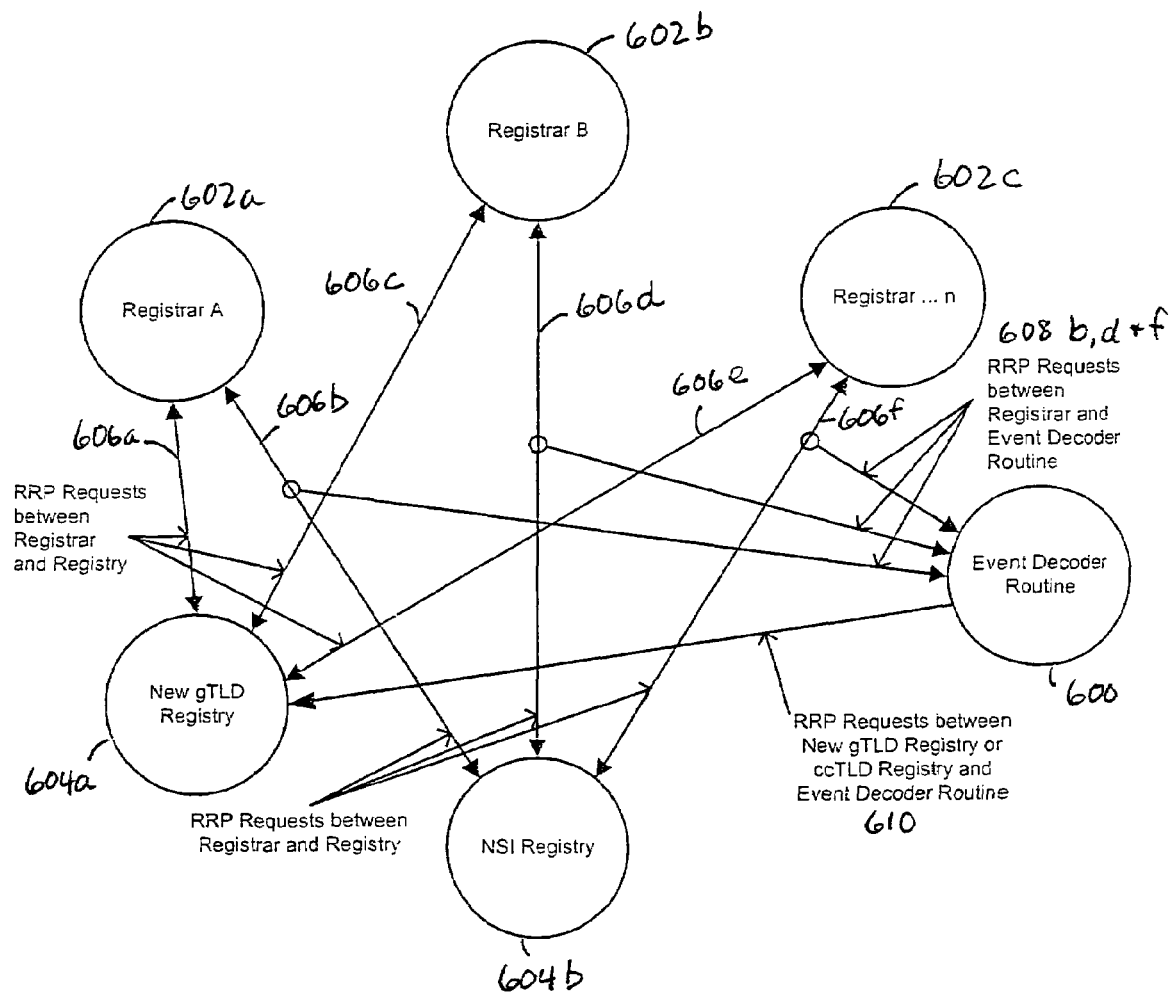
FIG. 6 schematically illustrates an alternate embodiment of an event decoder routine's connection with the system of FIG. 5, in which the event decoder routine employs a direct connection with a registry.

FIGS. 4-6 schematically illustrate various embodiments of the communications channels employable by the present invention. The present invention employs an event decoder routine to determine the status of a domain name through deciphering and handling the various types of communications or information that can come from a registrar or registry. As discussed below with respect to FIGS. 9 through 11, typical events handled by the event decoder routine include RRP events and WHOIS events. In particular, FIG. 4 illustrates the connections in a system in which an event decoder routine 400 is provided to monitor domain name registration activity with multiple registrars 402a through 402c and a single registry 404. Registrar to registry protocol requests 406a through 406c are sent from the registrars to the embodiment of the present invention 408a through 408c.

FIG. 5 illustrates the communication channels in a system in which an event decoder routine 500 is provided to operates with respect to multiple registrars 502a through 502c and multiple registries 504a and 504b. As illustrated in FIG. 5, the registrar to registry protocol requests 506a through 506f are sent 508a through 508f from the registrars 502a through 502c to the event decoder routine 500.

FIG. 6 illustrates communications channels of an alternative application of the present invention comprising multiple registrars and multiple registries, and in which the event decoder routine employs a direct communication channel with at least one registry. With particular reference to FIG. 6, the event decoder routine 600 is illustrated in connection with multiple registrars 602a through 602c and multiple registries 604a and 604b. Similar to FIG. 5, in FIG. 6 RRP requests 606a through 606f are illustrated between the registrars 602a through 602c and the registries 604a and 604b. For a registry 604b with which the embodiment of the present invention 600 does not communicate directly, the registrar to registry protocol requests 606b, 606c, and 606f can be sent 608b, 608d, and 608f to the event decoder routine 600. However, if the event decoder routine 600 can communicate directly with the registry 604a via a communications channel 610, then the event decoder routine 600 can receive and monitor domain name registration information directly from the registry 604a through the communications channel 610, rather than by receiving information from one of the RRP requests 608a, 608c, and 608e going to the registry 604a with which the direct communications are established.

Standard Ping Process

In a preferred embodiment of the present invention, a standard pinging process can be used to query information sources such as: 1) the VeriSign Registry SRS using the RRP protocol; 2) the DNS root servers; 3) the VeriSign Registry standard port 43 WHOIS server; 4) the registrars standard port 43 WHOIS server; or 5) other relevant present or future sources. It will be apparent to those skilled in the art that the present technology or suitable substitutes can be implemented to query information from registries other than the VeriSign Registry. Thus, this aspect of the present invention is applicable to gTLDs, ccTLDs, and other domains.

The process can be summarized as follows: A domain name is retrieved from a database of desired domain names. These domain names have been received from interested entities requesting acquisition or monitoring services. The domain name's availability can be first checked at the VeriSign Registry using the RRP connection into the SRS. If the domain name is available and there is an interested party requesting the domain, or if it is tagged for auction (as described below), it can be registered immediately with a partner registrar. After the acquisition, the interested entity can be notified accordingly (either of the successful acquisition, or of an upcoming auction).

If the domain name is not available for registration in the above check, embodiments of the present invention can still obtain information useful to entities interested in monitoring the status of the domain name or participating in a future auction. Queries can be made against a DNS root server(s), a registry WHOIS, and a registrar WHOIS, and a comparison made against the base data for changes that have been made to the domain's registration information. If changes have been made, the customer requesting the monitoring will be notified with a detailed description of the changes.

Figure 7:
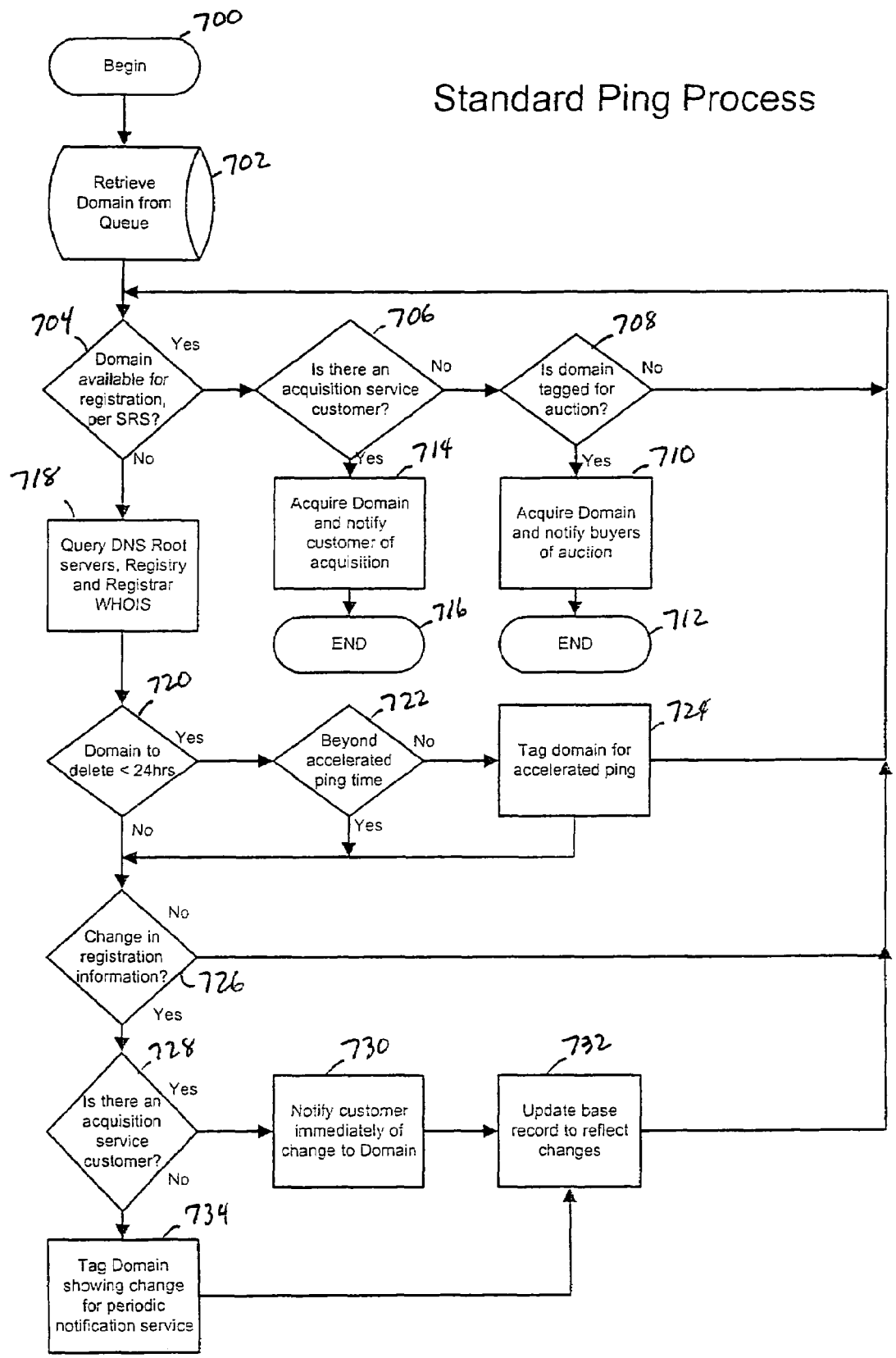
FIG. 7 depicts a pinging process consistent with the present invention.
Figure 8:
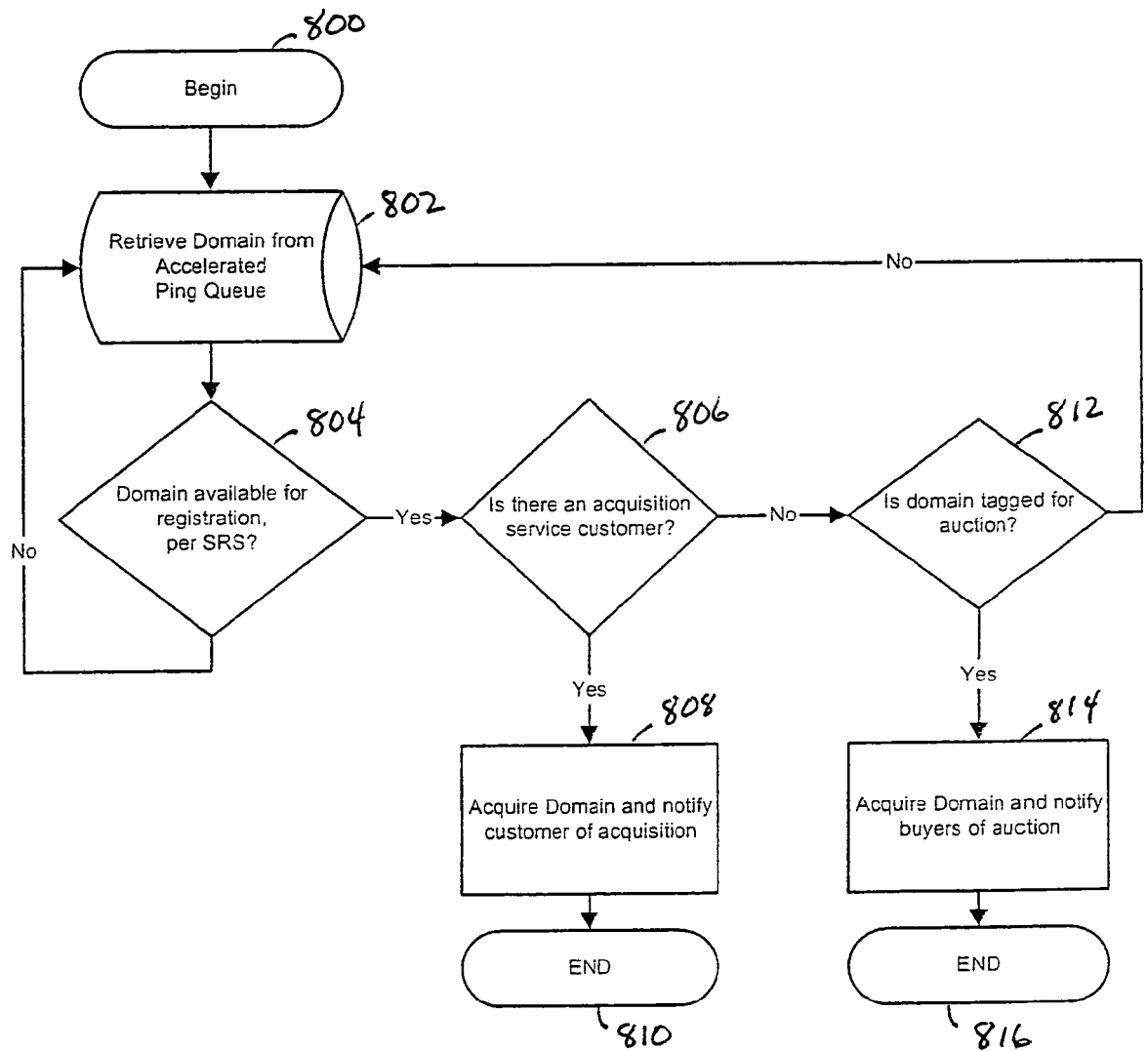
FIG. 8 depicts an alternative to the pinging process of FIG. 7, operated as an accelerated pinging process.
Figure 12:
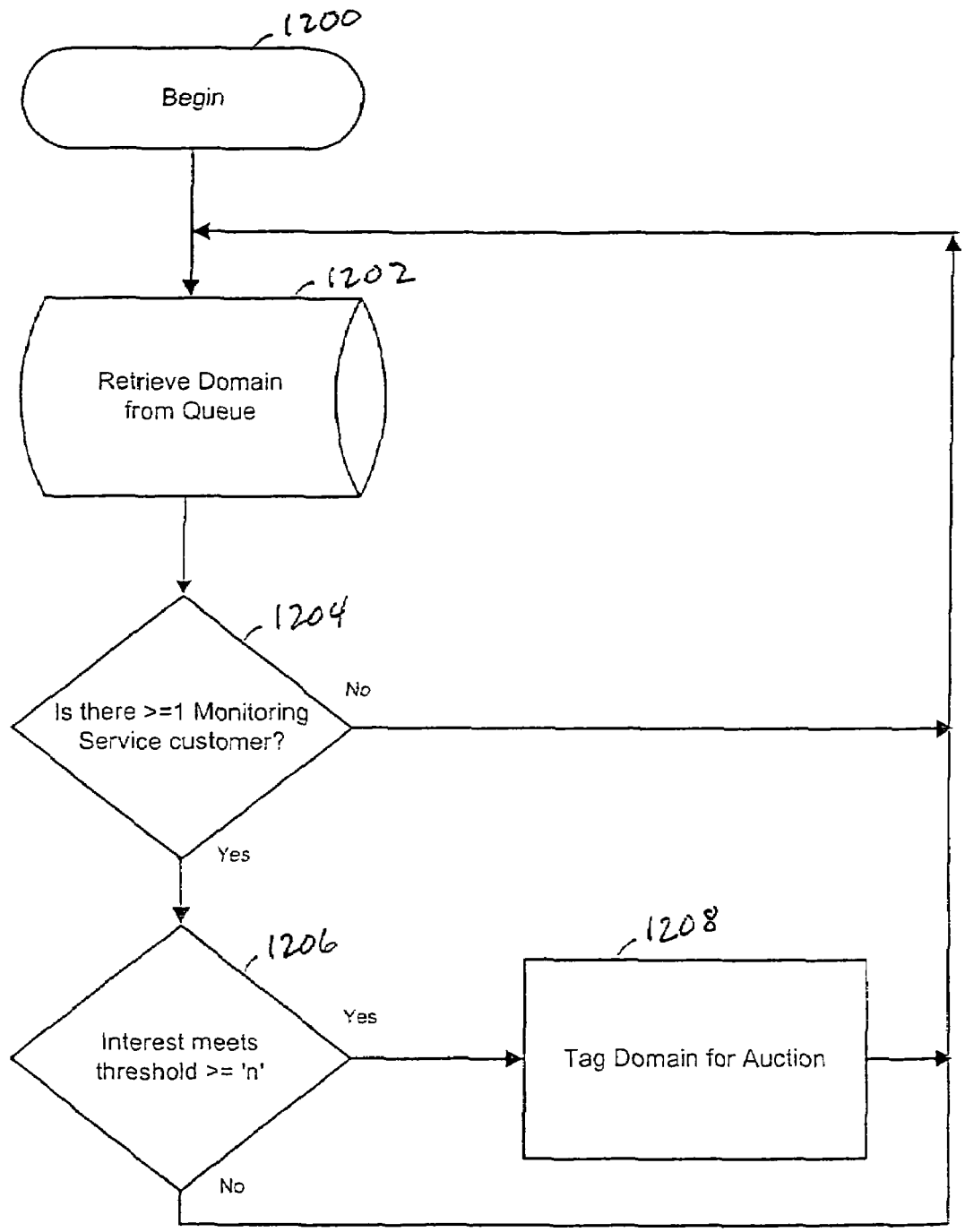
FIG. 12 illustrates a flow diagram for an auction process used to selectively identify second-level domain names suitable for auctioning and facilitate an auction of the identified second-level domain names.

FIG. 7 and FIG. 8 respectfully illustrate standard pinging and accelerated pinging processes in more detail. With particular reference to FIG. 7, the process begins at step 700. A desired domain name is retrieved from a database of desired domain names 702. In decision step 704, the present invention can ping the applicable SRS resources to determine if a domain name is available. If it is available, the system verifies that there is an acquisition customer (i.e., an interested entity desiring the domain name) 706. If there is not an interested entity, the next determination is whether the domain is tagged for auction 708. If it is not, the process repeats with the step of determining the availability of the same, or another, domain name 704. Continuing with decision step 708, if it is determined that the domain is tagged for auction, as illustrated in FIG. 12, the domain name is acquired in step 710 and potential buyers are notified of the auction, thus ending the pinging process 712 (although further efforts may be made to facilitate the actual auction process). The domain name can be acquired and registered in the name of a party requesting the acquisition, if one exists, or it can be acquired by a entity specifically designed to hold the domain name in escrow until the completion of a future auction.

Continuing with step 706, if there is an acquisition customer the process proceeds with step 714 and the domain name is acquired and the interested entity is notified of the acquisition, thus ending the pinging process at step 716. Returning to step 704, if the domain name is not available for registration, the system queries the DNS root servers registry and registrar WHOIS databases in step 718. After step 718, if the domain registration information or record is set to expire in less than a predefined limit, for example, 24 hours, as shown in step 720, the system determines if it is beyond the time for accelerated pinging 722. If it is not, the domain name is tagged for accelerated pinging at step 724 and the process continues to steps 726 and 704. If it is beyond the time for accelerated pinging or if the domain name is not set to be deleted in less than the predefined limit, the process continues with a determination of whether there has been a change in registration information 726. If there has not been a change in registration information, the process returns to the determination of whether the domain is available for registration 704. If there has been a change in registration information at step 726, the system determines if there is an acquisition customer at step 728. If there is an acquisition customer at step 728 the customer is notified of the change to the domain at step 730. The base record stored by the system is then updated at step 732 to reflect the changes in the registration information detected at step 726. The process then continues by looping back to step 704. If at step 728 it is determined that there is no acquisition customer, then the domain name record is tagged at step 734 to provide the change in registration information to monitoring customers as part of a periodic notification service. The process continues with step 732 as described previously.

FIG. 8 illustrates a preferred embodiment of the accelerated pinging process. After the process begins at step 800, the system retrieves a desired domain name from the accelerated pinging queue or database 802. These are primarily names that are tagged for accelerated pinging during the process of FIG. 7. The next step is a determination of whether the domain name is available based on queries of the SRS 804. If it is not available, the system returns to step 802. If the domain name is available, a determination is next made by the system as to whether there is an acquisition customer 806. If there is an acquisition customer at step 806, the domain name is acquired at step 808 and the acquisition customer is notified of the successful registration of the domain name. This ends the registration process at step 810. If there is no acquisition customer at step 806, the system makes a determination of whether the domain name is tagged for auction at step 812. If it is not tagged for auction, the process returns to step 802. If the domain name is tagged for auction, a domain name is acquired at step 814 and all potential buyers or interested entities are notified of the acquisition and upcoming auction. This path ends the process at step 816. This process is referred to as "accelerated pinging" because it is more streamlined than the standard pinging process of FIG. 6, and because it can be set to repeat at an accelerated rate (compared to the standard pinging process) in preparation for the domain name's impending expiration date and deletion from the SRS.

Decoding Event Information

The advanced monitoring technology employed by aspects of the present invention (such as the event decoder routine of FIGS. 4 through 6) is capable of processing information about real time events that is communicated through push, pull, or other communication strategies with domain registrars or registries. Both RRP events and domain names updated in the Registrars WHOIS servers can be processed. These events can be transmitted through an API designed to transfer the events in a secure manner and enter the events into a queue for further processing.

Figure 9:
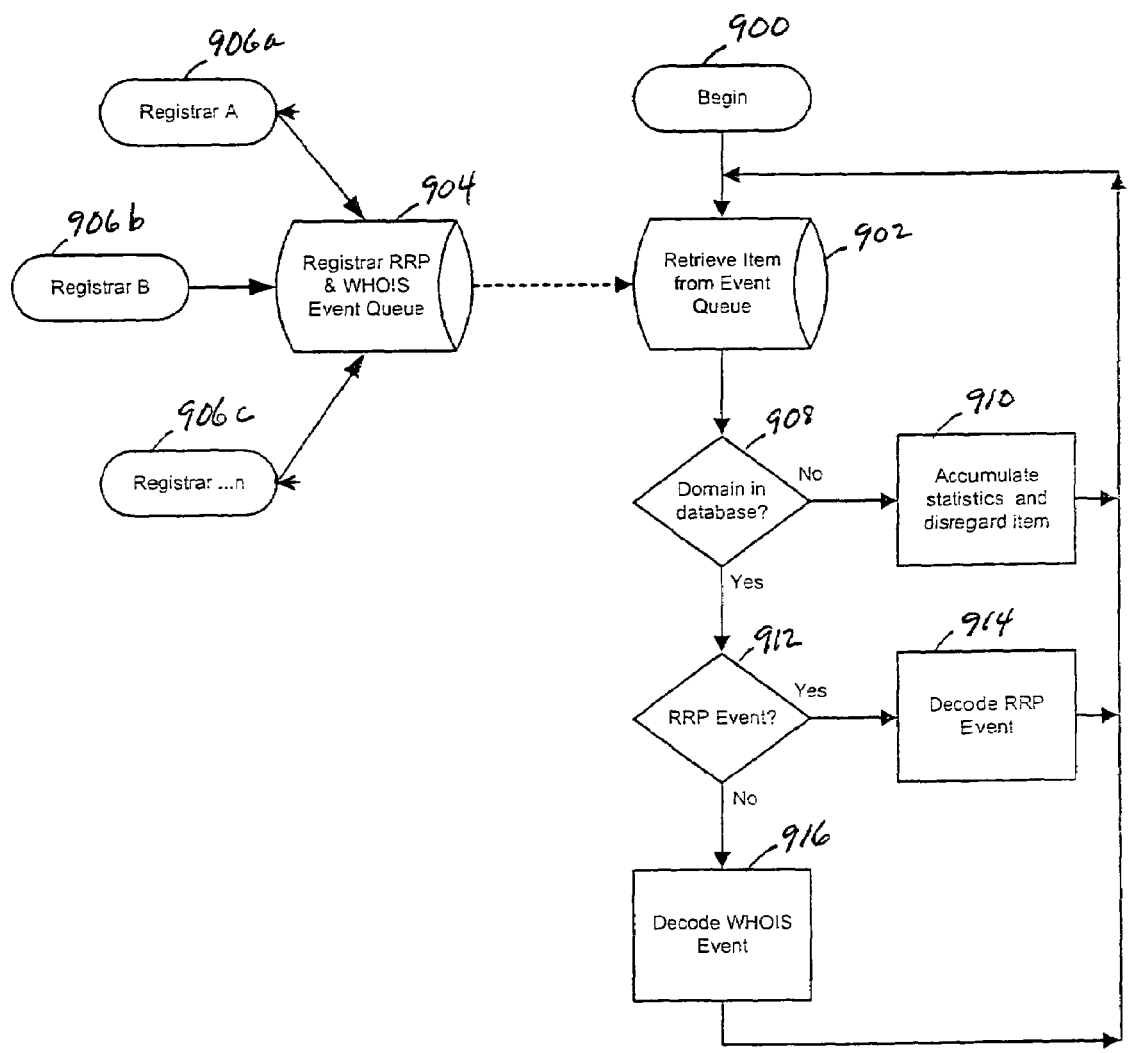
FIG. 9 schematically illustrates a Registrar to Registry Protocol and WHOIS event decoder process.

FIG. 9 depicts a RRP and WHOIS event decoder flow process. The process begins at step 900. A domain name event is then retrieved at step 902 from the RRP and WHOIS event queue 904 for decoding. The RRP and WHOIS event queue receives input from individual registrars 906a through 906c. The domain name that is the subject of the event retrieved at 902 is then compared to the domain names in the desired domain name database at step 908. If the domain name is not in the desired domain name database, statistics are accumulated from the event, but the event is otherwise disregarded at step 910. The process then repeats with step 902. If the domain name that is the subject of the event is in the database at step 908, the system determines if it is an RRP event, at step 912. If it is, the RRP event is decoded at step 914. The decoding of the RRP event 914 is more thoroughly illustrated in FIG. 10. After step 914, the process repeats with step 902. If at step 912 it is determined that the event is not an RRP event, the system can then continue with step 916 to decode the event as a WHOIS event. The process of decoding a WHOIS event is more thoroughly illustrated in FIG. 11. The process then returns to step 902 and repeats.

RRP Event Decode

RRP events are decoded first. These events and actions can include deletions, additions, modifications, renewals, or transfers of a domain name registration. A preferred embodiment of the present invention handles each of these events in the following manner. For deletions of the domain name record in a registry, the customer can be notified and the domain name can be designated as a candidate for the accelerated pinging process described previously. If the RRP event was an addition of a domain name record to a registry, the domain can be flagged for inclusion in any of several forms of periodic notifications that can be made available to subscribers of services embodying the present inventions. This could be an online posting made available through a Web site, or an electronic journal, e-mail, or newsletter, or other forms of communications. Making the customers aware of the addition of the domain name record can also lead to the customer requesting further services, such as services to monitor and acquire the domain name when the registration expires. If the RRP event is a modification or transfer of a domain name record, the customer requesting the monitoring service can be notified of the event. If the RRP even was a renewal of the domain name registration, the customer of the monitoring service can be notified and the domain name can be removed from the accelerated pinging status (if, for example, it was designated for accelerated pinging because of an approaching registration expiration date).

For RRP events for which a customer receives notification, such as for deletions, modifications, renewals, and transfers, the notification can be provided immediately after decoding the event, or several events may be decoded and aggregated, with notifications being sent to customers informing them of all of the events simultaneously. In the case of a transfer RRP event, customers that have requested acquisition services to acquire or re-acquire a domain name once the prior registration period ends can receive immediate notification that a transfer request has been made against the domain. Customers that have a lesser interest in the domain name, such as those that are only monitoring the domain name, but not requesting acquisition, can see the result of a transfer action after the fact from data comparisons of WHOIS data.

Figure 10:
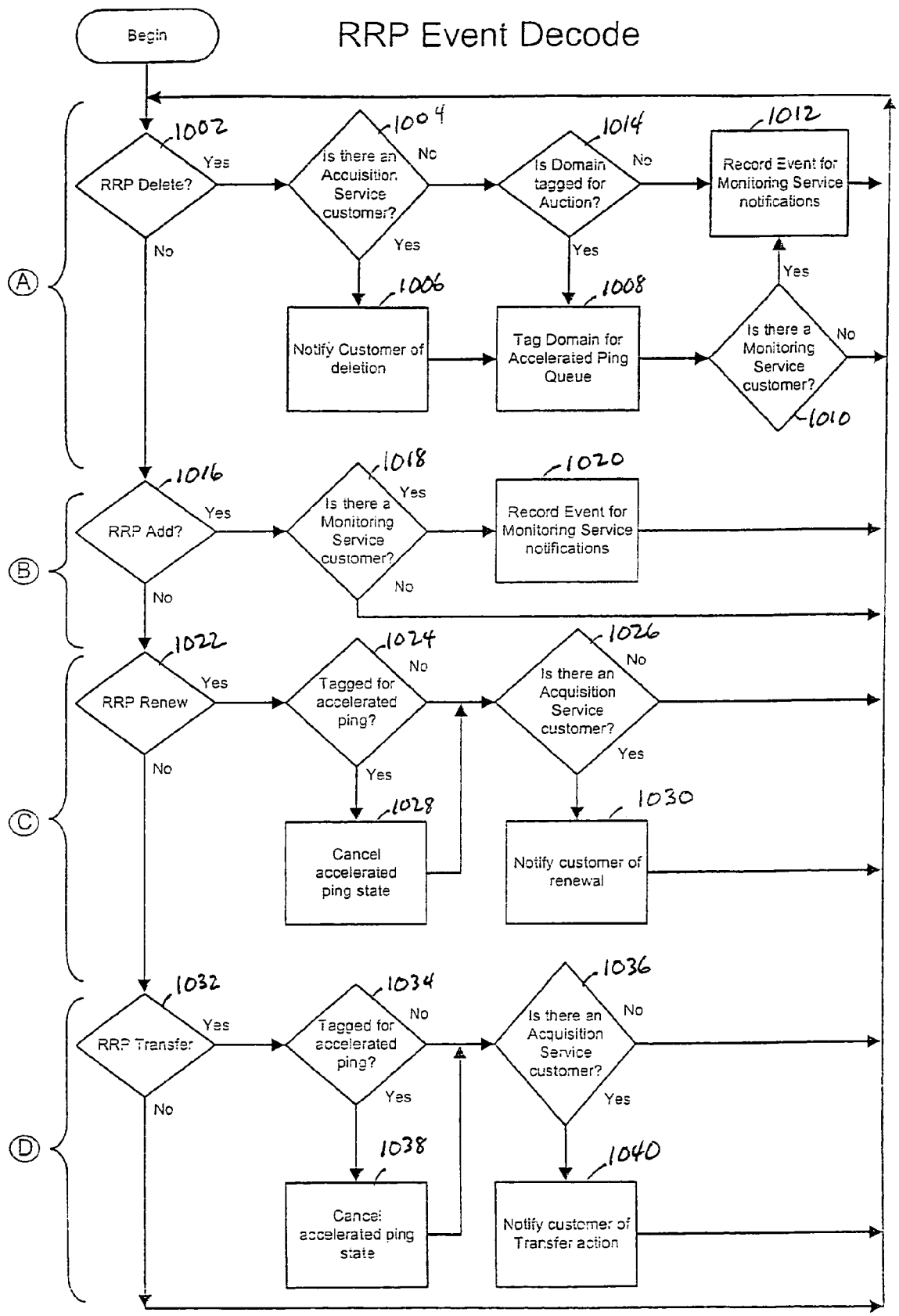
FIG. 10 illustrates a Registrar to Registry Protocol event decode process.

FIG. 10 illustrates the registrar to registry protocol (RRP) event decode process depicted as step 914 in FIG. 9. In FIG. 10, the process begins at step 1000. The RRP events of FIG. 10 are divided into four separate sections for illustrative purposes. The presentation of the event analysis process sections in series is for illustrative purposes and not meant to be limiting. Continuing with step 10, Section A illustrates the handling of an RRP deletion event. Section B illustrates the handling of an RRP addition event. Section C illustrates the handling of an RRP renewal event. Finally, Section D illustrates the handling of an RRP transfer event. Those skilled in the art will readily determine that there can be alternative configurations of the system that would prove equally successful. Those modifications are also considered part of the scope of the present invention as determined by the attached claims.

The presence of an RRP deletion event is determined in step 1002. If the determination is made in step 1002 that there is no RRP deletion event, the system continues with the analysis of other types of events. If an RRP deletion event is detected in step 1002, the system next determines if there is an acquisition customer at step 1004. If there is an acquisition customer, the acquisition customer is notified of the deletion in step 1006. The domain is tagged for accelerated pinging in step 1008 and a determination is made in step 1010 whether or not there is a monitoring customer. If there is not a monitoring customer, the process returns to step 1000. If there is a monitoring customer, the event is recorded for notification to the monitoring customer at step 1012. Continuing with step 1004, if there is no acquisition customer, the system determines if the domain is tagged for auction at step 1014. If the domain is tagged for auction, the process continues with step 1008 as previously described. If the domain is not tagged for auction at step 1014, the process continues with step 1012 as previously described, ultimately returning to step 1000.

If the determination is made in step 1002 that there is no deletion event, the system next analyzes whether or not there was an addition event at step 1016. If at step 1016 there is an addition event, the system next determines if there is an acquisition customer at step 1018. If there is no acquisition customer at step 1018, the process continues by returning to the beginning 1000. If there is an acquisition customer detected at 1018, the event is recorded for notification of the acquisition customer or monitoring customer at step 1020.

If there is no deletion event and no addition event, the system determines whether there is a renewal event at step 1022. If a renewal event is detected at step 1022, the system next determines if the domain name that is the subject of the renewal event was tagged for accelerated pinging 1024. If it was not tagged for accelerated pinging, the system determines if there is an acquisition customer at step 1026. If not, the system returns to the beginning 1000. Returning to step 1024, if the domain name was tagged for accelerated pinging, the accelerated pinging state is canceled 1028. The system then continues with step 1026 as before. If at step 1026 it is determined that there is an acquisition customer, the acquisition customer is notified of the renewal event at step 1030. The system then returns to the beginning 1000.

If there is no deletion event detected at step 1002, addition event detected at 1016, or renewal event detected at step 1022, the system continues with a determination at step 1032 of whether there has been a transfer event. If there has not been a transfer event, the system returns to the beginning 1000. If there has been a transfer event detected at step 1032, the system next determines if the domain name that is the subject of the event was tagged for accelerated pinging at step 1034. If the domain name was not tagged for accelerated pinging, the system continues with a determination of whether there is an acquisition customer at step 1036. If the determination was made at step 1034 that the domain name was tagged for accelerated pinging, the accelerated pinging state is canceled 1038 before proceeding to step 1036. If an acquisition customer is detected at step 1036, the customer is notified of the transfer action at step 1040. After the acquisition customer is notified of the transition action at step 1040, or if there is no acquisition customer at step 1036, the process returns to the beginning 1000.

WHOIS Event Decode

Figure 11:
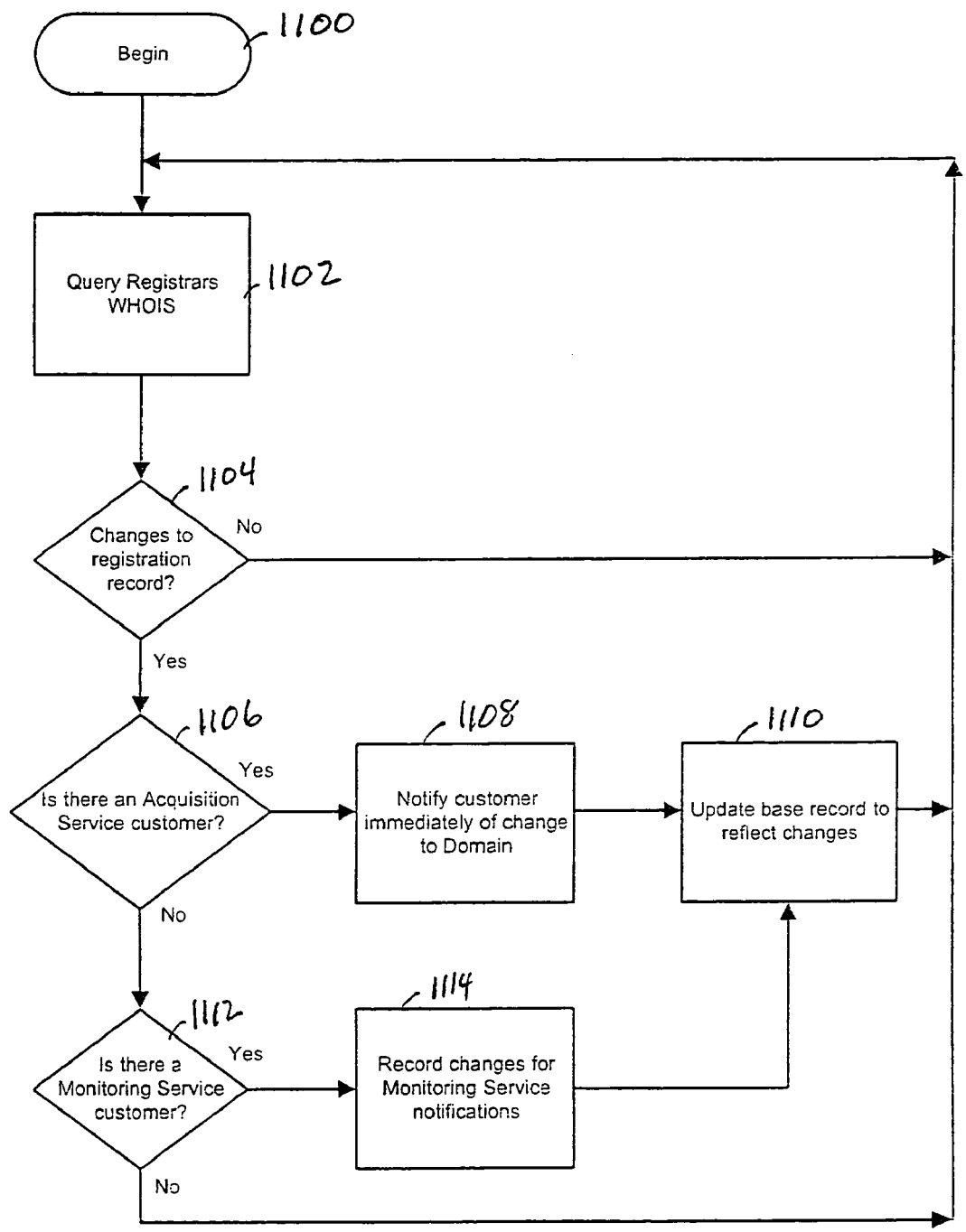
FIG. 11 schematically illustrates a WHOIS event decode process.

A second type of event includes WHOIS events. These events typically affect the registration information for a particular name. This registration information is typically stored in WHOIS databases at the registrar or registry level. When the customer first signs up for acquisition services or monitoring services for a domain name, a reference copy of the domain name's registration record is captured. This "base" view will be the default data that future queries will be compared against until the "base" view changes, at which time the newer view becomes the new "base." Any changes between the views will cause the customer to receive notice of changes made to the registration records kept in the WHOIS database. Changes may just indicate updates made by the owner of the domain name, or they may be fraudulent changes to any of the registration data. FIG. 11 illustrates a preferred WHOIS event decode process. FIG. 11 begins at step 1100. The system next queries a registrar's WHOIS database 1102. The system then determines if there have been changes to the registration record 1104. If no changes have been detected at step 1104, the process returns to the beginning 1100. If changes to the registration record were detected at step 1104, the system proceeds with a determination at step 1106 of whether there is an acquisition services customer for that domain name. If there is, the customer is notified of the change to the domain name registration at step 1108 and the database record is updated at step 1110 to reflect the registration record changes. The system returns to the beginning 1100 after completion of step 1110. If no acquisition customer is detected at step 1106, the system proceeds to determine, at step 1112, whether there is a monitoring services customer. If there is, the changes to the domain name registration are recorded in step 1114 and the system proceeds with step 1110 as previously described. If there is no monitoring customer, the system returns to the beginning 1100 and the process repeats.

The current registration system, the SRS, is defined as a "thin registry." In a thin registry, the registry only maintains a small part of the domain name's registration information. This information typically includes the following: domain name (second level domain, SLD, and the top level domain, TLD); creation, modification, and expiration dates for the domain name record; domain name server information; registrar of creation; and current holding registrar. In a thin registry, the registrar of the domain name maintains the other information about the domain names registered with them. This information includes registrant and contact information, such as: name(s), addresses, phone and fax numbers, and e-mail addresses. Information is frequently categorized as billing, administrative, and technical contact information. Under the current ICANN Accreditation Agreement, they also maintain the name server information.

Some newer registries have proposed, and some have actually implemented, a "thick registry" system. In a thick registry system, nearly all of the above information is combined and kept at the registry level, and not with the registrar. The monitoring, acquisition, and other technologies of the present invention will continue to work and integrate with thick or thin registries. Rather than pinging or receiving pushed information from various registrars, the registries would be the sources of information and integration for technology consistent with the present invention. Establishing contractual relationships with the various registries or integrating with their databases would further aid the dissemination of information and the implementation of the technologies embodying the present invention.

Auction Tagger

Another aspect of the present invention can use the data contained in the desired domain name database 110 of FIG. 1, representing domain name demand, and match that information with gathered information representing domain name supply. Requests to monitor a domain name, or requests for acquisition services for a domain name, can also be used to indicate domain name demand. As shown by the seller database 114 of FIG. 1, the supply-side information can be cataloged in a database of domain names that individuals wish to sell. One potential source of domain name supply information can be through various Web site operators that maintain Web sites specializing in advertising or otherwise indicating domain names that entities wish to sell. The result is the creation of a type of domain name auction site or service that facilitates transactions transferring ownership of the domain names.

Once a domain reaches a predefined level of interest, that domain is tagged as an auctionable domain. Interest in a domain name can be a function of the number of interested parties, their level of interest, or other factors, weighted independently or in combination. For example, while the existence of several entities interested in a particular domain name may meet the threshold for interest, so too may the existence of one or two interested entities to whom the domain name is of particular importance. This information can be provided by the interested entity. A daily run can be made against the database and domain names reaching the threshold of interest are tagged. A domain name tagged in this manner can be monitored and acquired as it is deleted, or the existing owner may be contacted. A domain name can be acquired for an entity that has requested acquisition services, or, it can be acquired and held in escrow by an escrow agent pending the outcome of any future auction. Owners of domains that are tagged as having an actionable level of interest can be contacted to see if they have an interest in auctioning their domain using an embodiment of the present invention. As used throughout this specification and the attached claims, the term "auction" is used broadly so as to encompass transactions not traditionally referred to using that term, such as an explicit unilateral offer to purchase or sell a domain name. If the number of domain name monitoring requests (or other indicator of domain name interest) indicates that the interest in a domain name is or has fallen below the threshold interest level, the domain can be "untagged" for auction.

FIG. 12 diagrams an auction tagger process used to identify domain names suitable for auctioning. FIG. 12 begins the process with step 1200. The system selects a domain name by retrieving it from the queue at step 1202. The system then determines if there is at least one interested entity at step 1204. If there is not at least one interested entity identified at step 1204, the system returns to the beginning 1200 and repeats with a later identification of interested entities 1204. If there is at least one interested entity identified at step 1204, the system proceeds with a determination, at step 1206, of whether the number of interested entities (or their individual or cumulative level of interest) meets a predetermined threshold of interest. If the determination is made that the interest level does not meet the threshold at step 1206, the process returns to the beginning 1200 and repeats. If the determination is made at step 1206 that the interest level exceeds the predetermined threshold of interest, the domain name is tagged for auction in step 1208 and the process returns to step 1200, repeating with the next domain name in the queue. It should also be noted that once a domain name is tagged for auction, separate procedures can be implemented to facilitate the auction process. One such procedure is to notify the interested entities that the domain is available for auction or has been acquired and is tagged for auction. Another example could be to notify the registrant that there is sufficient interest for an auction, should the registrant be interested in transferring the domain name. Communications can then be established between the seller of the domain name registration and the potential buyers. Multiple buyers can be asked to input bids during a set bidding period or in a live format, either in-person, over a phone, or via a Web site.

Avoiding Priority Contests

In the present invention, priority contests, or disputes regarding to which interested entity a domain name should be registered, can be resolved, or avoided altogether, through implementation of a first-in-time priority rule. While multiple interested entities can request acquisition services for a domain name, the system can limit the acquisition service to only one interested entity per domain name. The first interested entity to request the acquisition service can be granted priority over any other interested entity. Should the domain name become available, it can automatically be registered for the interested entity with the acquisition service. Because multiple entities can receive monitoring services without conflicts those services do not have to be similarly limited to one entity.

The fact that there can be multiple interested entities requesting monitoring services provides a convenient method for determining and continually monitoring the level of interest in any given domain name. Domain name related interest can be collected from registrar and other domain-related sites, including third party sources, world wide. Because domain names have to be registered online, tapping these major sources indicating domain name interest ensures a very accurate, thorough, and valuable total representation of domain name interest. Each monitoring service request indicates an entity that may have an interest in acquiring the domain name. Requests for acquisition services can also indicate demand for a domain name. Although implementation of priority contest rules may ensure that only one entity per domain name can be provided acquisition services, the number of interested entities that request acquisition services (even if prior contest rules prevent their requests from being granted), combined with the number who request monitoring services can indicate demand for the domain name.

Alternatively, direct input can be received from interested entities that would like to make an offer for a particular domain name. Direct solicitations can be received through such methods as a telephone call center, e-mail, or a Web site with an HTML or similar form for receiving input from a remote computer user. If there are enough entities interested in a particular domain name, or, if there are only a few interested entities but the level of interest is high enough, that domain name can be auctioned among the interested entities. While an interested entity using the acquisition service of the present invention will automatically obtain the domain name when it becomes available for registration, that entity can also be informed that there are several other interested entities that have requested monitoring services (or unfulfilled requests for acquisition services) and are potentially interested in acquiring the name. This informs the registrant that the domain name is a good candidate for an auction or potential transfer through resale. By aggregating buyer demand, in addition to seller demand, embodiments of the present invention can establish an effective electronic auction or business-to-business exchange for domain names. One or more potential sellers can be matched with one or more potential buyers in a "domain name market."

It will be obvious to those having skill in the art that many changes may be made to the details of the above-described embodiment of this invention without departing from the underlying principles thereof. The scope of the present invention should, therefore, be determined only according to the claims made thereto.

The invention claimed is:

1. A method of internet domain name management comprising the steps of:

establishing a contractual relationship with a domain name registrar to obtain priority in re-allocation of a domain name registration sponsored by the registrar after expiration of a current registration;

establishing a web site interface for interaction with entities, the web site enabling an interested entity to identify a domain name of interest, wherein the identified domain name is registered in a selected registry and the registration of the identified domain name is sponsored by the said domain name registrar;

enabling the interested entity to request a re-allocation of the domain name after expiration of the current registration;

recording in a database identification of the registered domain name of interest; and after the registration of the domain name expires, but prior to purge of the domain name registration from the corresponding registry, accessing the database to identify the interested entity and re-allocating the domain name to the interested entity, whereby the interested entity becomes a new registrant of the domain name and the domain name registration is not purged from the registry;

wherein the re-allocating step includes updating the identity of the registrant of the domain name in the records of the sponsoring registrar to reflect the interested entity as the new registrant.

2. The method of internet domain name management according to claim 1 wherein:

the web site interface enables receiving multiple backorders from multiple different interested entities, each one of them seeking to acguire a new registration of the same domain name of interest;

auctioning the domain name among the multiple interested entities who entered backorders for the domain name; and wherein said re-allocating the domain name to the interested entity comprises reallocating the domain name registration to the winner of the auction.

3. The method of internet domain name management according to claim 2 wherein the auction is conducted after expiration of the current registration but prior to the sponsoring domain name registrar sending a delete command to the said registry.

* * * * *

UNITED STATES PATENT AND TRADEMARK OFFICE
CERTIFICATE OF CORRECTION

| | | |
|---|---|---|
| PATENT NO. | : 7,490,124 B2 | Page 1 of 1 |
| APPLICATION NO. | : 11/413647 | |
| DATED | : February 10, 2009 | |
| INVENTOR(S) | : King et al. | |

It is certified that error appears in the above-identified patent and that said Letters Patent is hereby corrected as shown below:

At column 20, line 33, in Claim 2, delete "acguire" and insert -- acquire --, therefor.

Signed and Sealed this

Twenty-second Day of December, 2009

David J. Kappos
*Director of the United States Patent and Trademark Office*